United States Patent [19]

Murofushi et al.

[11] Patent Number: 5,846,682

[45] Date of Patent: Dec. 8, 1998

[54] LIGHT DECOLORIZABLE RECORDING MATERIAL, INK AND TONER

[75] Inventors: Katsumi Murofushi; Yoshikazu Hosada, both of Kawasaki, Japan

[73] Assignee: Showa Denko K.K., Tokyo, Japan

[21] Appl. No.: 799,212

[22] Filed: Feb. 13, 1997

Related U.S. Application Data

[63] Continuation of Ser. No. 336,760, Nov. 8, 1994, abandoned, which is a continuation of Ser. No. 24,742, Mar. 2, 1993, abandoned.

[51] Int. Cl.$^6$ .............................. G03G 9/09; C09D 11/00; C08K 5/55
[52] U.S. Cl. ..................... 430/106; 574/183; 574/184; 574/185; 106/31.73; 106/31.79; 106/31.32; 430/339
[58] Field of Search ..................................... 430/106, 339; 106/31.29, 31.31, 32.23; 524/183, 184, 185

[56] References Cited

U.S. PATENT DOCUMENTS

| | | |
|---|---|---|
| 2,221,776 | 11/1940 | Carlson . |
| 2,297,691 | 10/1942 | Carlson . |
| 2,618,552 | 11/1952 | Wise . |
| 2,874,063 | 2/1959 | Greig . |
| 3,985,663 | 10/1976 | Lu et al. ................................ 106/31.32 |
| 4,307,182 | 12/1981 | Dalzell et al. ........................... 430/339 |
| 4,336,323 | 6/1982 | Winslow ................................ 106/31.32 |
| 4,950,581 | 8/1990 | Koike et al. . |
| 5,045,420 | 9/1991 | Hosono et al. . |
| 5,176,984 | 1/1993 | Hipps, Sr. et al. . |
| 5,185,226 | 2/1993 | Grosso et al. . |
| 5,194,472 | 3/1993 | Wilson et al. ........................... 430/106 |
| 5,236,808 | 8/1993 | Smothers . |
| 5,290,346 | 3/1994 | Fujioka ................................ 106/31.23 |

FOREIGN PATENT DOCUMENTS

| | | |
|---|---|---|
| A1 0468465 | 1/1992 | European Pat. Off. . |
| 4232910 | 11/1942 | Japan . |
| 4324748 | 10/1943 | Japan . |
| 57-130046 | 8/1982 | Japan . |
| 57-191650 | 11/1982 | Japan . |
| 59-78364 | 5/1984 | Japan . |
| 63-226665 | 9/1988 | Japan . |
| 64-13142 | 1/1989 | Japan . |
| 1-229084 | 9/1989 | Japan . |
| 1-271469 | 10/1989 | Japan . |
| 2-22370 | 1/1990 | Japan . |
| 2190383 | 7/1990 | Japan . |
| 2190385 | 7/1990 | Japan . |

OTHER PUBLICATIONS

*The Sigma–Aldrich Handbook of Stains, Dyes and Indicators*, Aldrich Chemical Company, Inc., by Floyd J. Green, p. 448.

*Dyestuff Handbook*, ISBN 4–06–139652–8(0) (KS), Issued on Mar. 20, 1986, pp. 361, 415, xi.

*Primary Examiner*—Christopher D. Rodee
*Attorney, Agent, or Firm*—Sughrue, Mion, Zinn, Macpeak & Seas, PLLC

[57] ABSTRACT

A light decolorizable recording material comprising a colored dye having absorptions in the visible light region and a boron compound represented by the general formula (1),

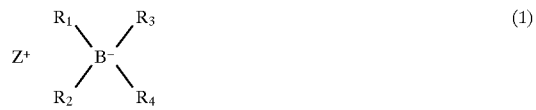

wherein $R_1$, $R_2$, $R_3$ and $R_4$ each independently represents an alkyl, aryl, allyl, aralkyl, alkenyl, alkynyl, silyl, heterocyclic, substituted alkyl, substituted aryl, substituted allyl, substituted aralkyl, substituted alkenyl, substituted alkynyl or substituted silyl group, and $Z^+$ represents a quaternary ammonium, quaternary pyridinium, quaternary quinolinium or phosphonium cation.

10 Claims, No Drawings

LIGHT DECOLORIZABLE RECORDING MATERIAL, INK AND TONER

This is a continuation of application Ser. No. 08/336,760 filed Nov. 8, 1994 abandoned, which is a Continuation of Ser. No. 08/024,742 filed on Mar. 2, 1993 abandoned.

BACKGROUND OF THE INVENTION

1. Field of the Invention

The present invention relates to a light decolorizable recording material excellent in stability to the light of a fluorescent lamp or the like, which is decolorized when a visible radiation is applied thereto, and a toner or ink containing this light decolorizable recording material as a colorant.

2. Description of the Prior Art

In the technical fields such as printing and copying, the environmental resistance of recording materials, i.e. shelf stabilities such as light fastness, moisture resistance, solvent resistance, and heat resistance have attracted the attention of the industrial world, and improvements of the physical properties of the recording materials have extensively been carried out. Especially, in the fields of electronic photographic recording and electrostatic recording, developments have extensively been put forward. For example, in electronic photographic recording, many processes are known, as disclosed in U.S. Pat. No. 2297691 Specification, Japanese Examined Patent Publication No. 42-23910, Japanese Examined Patent Publication No. 43-24748, and the like, and according to these processes, an electric latent image is formed on a light-sensitive material by various means, using a photoconductive substance in general, and the formed latent image is subsequently developed with a toner, so as to be converted into a visible image, whereafter the toner image is transferred to a transfer material such as paper, if necessary, and thereafter fixed by heating or pressurization, so as to obtain a copied image. In addition, various developing methods of visualizing an electrostatic latent image with a toner have been known (e.g. U.S. Pat. No. 2874063 Specification, U.S. Pat. No. 2618552 Specification, and U.S. Pat. No. 2221776 Specification). The toner used in the above heat fixing method is prepared generally by fusedly mixing a colorant such as carbon black and an additive such as electric charge regulator into a thermoplastic resin such as a styrene-butyl acrylate copolymer, so as to be uniformly dispersed, and pulverizing the obtained mixture to a desired particle size by a pulverizing mill or a dispersing machine, after cooling of the mixture. In addition, in the fields such as printing and copying, coloring of materials has recently been spread, and the improvement of the physical properties of colorant, electric charge regulator and the like has extensively been carried out (e.g. Japanese Unexamined Patent Publication No. 57-130046, Japanese Unexamined Patent Publication No. 57-191650). Further, in the fields of printing, there are various printing methods, e.g. offset printing, relief printing, photogravure, hole print printing, or special printings such as flexographic printing, metal printing, plastic printing, glass printing, transfer printing or the like, and electronic printing by the use of a printer such as impact printer and non-impact printer, and the inks used in these printing methods consist mainly of a vehicle as a binder, and a colorant such as a dye or pigment. Further, recently, the development of ultraviolet curing inks have extensively been forwarded for the purpose of preventing environmental pollution by not using solvents in inks, improving productivity by a rapid curing, or improving the physical properties of the cured coat (e.g. Japanese Unexamined Patent Publication No. 1-229084, Japanese Unexamined Patent Publication No. 1-271469, and Japanese Unexamined Patent Publication No. 2-22370). Nevertheless, the toners for electrophotographic recording and printing inks have the defects that, after having been printed, the printed image portion cannot be completely decolorized. Therefore, when printing is again made on the image portion, the printed portions are overlapped to become difficult to be read, so that the recording paper on which printing has been made cannot be redused.

SUMMARY OF THE INVENTION

An object of the present invention is to provide a recording material capable of being decolorized at set and printed recorded portion with visible light, capable of making out the matters reset and reprinted on the same portion, and being excellent in stability to the light of a fluorescent lamp.

To solve the above problems, intensive investigations were made into colored dyes having absorptions in the visible light region ranging from 400 to 780 nm and boron compounds, and as a result, it was found that a light decolorizable recording material, which is sufficiently stable to an indoor light such as the light of a fluorescent lamp, and which is capable of being decolorized by the irradiation of a visible light, can be obtained, and thus the present invention was achieved.

That is, in accordance with the present invention, there is obtained a light decolorizable recording material, a colored dye of which does not disappear until a visible light-containing light is irradiated thereto, a colored coloring matter thereby disappearing, by combinedly using a boron compound having the formula (1),

(1)

wherein $R_1$, $R_2$, $R_3$, and $R_4$ independently represents an alkyl, aryl, allyl, aralkyl, alkenyl, alkynyl, silyl, heterocyclic, substituted alkyl, substituted aryl, substituted allyl, substituted aralkyl, substituted alkenyl, substituted alkynyl or substituted silyl group, and $Z^+$ represents quaternary ammonium cation, quaternary pyridinium cation, quaternary quinolinium cation, or phosphonium cation, and a colored dye having absorptions in the visible light region. In addition, the present light decolorizable recording material is stable even when it is exposed to the light of a fluorescent lamp or the like, and practical stability is obtained.

DESCRIPTION OF THE PREFERRED EMBODIMENTS

The light decolorizable recording material according to the present invention can provide a light decolorisable composition which is decolorized by irradiating light having a wavelength in the visible light region but stable under the light of a fluorescent lamp or the like.

The boron compound used in the present invention is represented by the general formula (1), and as the groups $R_1$, $R_2$, $R_3$, and $R_4$, there are mentioned an alkyl, aryl, allyl, aralkyl, alkenyl, alkynyl, silyl, heterocyclic, substituted alkyl, substituted aryl, substituted allyl, substituted aralkyl, substituted alkenyl, substituted alkynyl, substituted silyl group, and the like, and examples of the preferred groups among the above groups are a phenyl, anisyl, ethoxyphenyl, toluyl, t-butylphenyl, fluorophenyl, chlorophenyl, diethylaminophenyl, xylyl, n-butyl, n-pentyl, n-hexyl, n-heptyl, n-octyl, n-dodecyl, cyclohexyl, cyclohexenyl, methoxymethyl, methoxyethyl, vinyl, allyl, triphenylsilyl, dimethylphenylsilyl, dibutylphenylsilyl, trimethylsilyl, piperidyl, thienyl, furyl groups and the like. As concrete examples of the anions, there may be mentioned n-methyltriphenyl borate, n-ethyltriphenyl borate, n-butyltriphenyl borate, n-octyltriphenyl borate, n-dodecyltriphenyl borate, n-methyltri-p-tolyl borate, n-ethyltri-p-tolyl borate, n-butyltri-p-tolyl borate, n-octyltri-p-tolyl borate, n-dodecyltri-p-tolyl borate, n-methyltrianisyl borate, n-ethyltrianisyl borate, n-butyltrianisyl borate, n-octyltrianisyl borate, n-dodecyltrianisyl borate, dimethyldiphenyl borate, diethyldiphenyl borate, di-n-butyldiphenyl borate, di n-octyldiphenyl borate, di-n-dodecyldiphenyl borate, dimethyldi-p-tolyl borate, diethyl-p-tolyl borate, di-n-butyl di-p-tolyl borate, di-n-octyldi-p-tolyl borate, di-n-dodecyl di-p-tolyl borate,dimethyldianisyl borate, diethyldianisyl borate, di-n-butyldianisyl borate, di-n-octydianisyl borate, di-n-dodecyldianisyl borate, tetraphenyl borate, tetraanisyl borate, tetra-p-tolyl borate, triphenylnaphthyl borate, tri-p-tolylnaphthyl borate, tetrabutyl borate, tri-n-butyl(triphenylsilyl) borate, tri-n-butyl(dimethylphenylsilyl) borate, n-octyldiphenyl (di-n-butyl phenylsilyl) borate, dimethylphenyl(trimethylsilyl) borate ions and the like.

In addition, as the cation ($Z^+$), there are mentioned quaternary ammonium cation, quaternary pyridinium cation, quaternary quinolinium cation and phosphonium cation.

Definite examples of such a boron compound are tetramethylammonium methyltriphenyl borate, tetramethylammonium n-butyltriphenyl borate, tetramethylammonium n-octyltriphenyl borate, tetramethylammonium n-dodecyltriphenyl borate, tetramethylammonium methyltri-p-tolyl borate, tetramethylammonium n-butyltri-p-tolyl borate, tetramethylammonium n-octyltri-p-tolyl borate, tetramethylammonium n-dodecyltri-p-tolyl borate, tetramethylammonium methyltrianisyl borate, tetramethylammonium n-butyltrianisyl borate, tetramethylammonium n-octyltrianisyl borate, tetramethylammonium n-dodecyltrianisyl borate, tetraethylammonium methyltriphenyl borate, tetraethylammonium n-butyltriphenyl borate, tetraethylammonium n-octyltriphenyl borate, tetraethylammonium n-dodecyltriphenyl borate, tetraethylammonium methyltri-p-tolyl borate, tetraethylammonium n-butyltri-p-tolyl borate, tetraethylammonium n-octyltri-p-tolyl borate, tetraethylammonium n-dodecyltri-p-tolyl borate, tetraethylammonium methyltrianisyl borate, tetraethylammonium n-butyltrianisyl borate, tetraethylammonium n-octyltrianisyl borate, tetraethylammonium n-dodecyltrianisyl borate, tetrabutylammonium methyltriphenyl borate, tetrabutylammonium n-butyltriphenyl borate, tetrabutylammonium n-octyltriphenyl borate, tetrabutylammonium n-dodecyl triphenyl borate, tetrabutylammonium methyltri-p-tolyl borate, tetrabutylammonium n-butyltri-p-tolyl borate, tetrabutylammonium n-octyltri-p-tolyl borate, tetrabutylammonium n-dodecyltri-p-tolyl borate, tetrabutylammonium methyltrianisyl borate, tetrabutylammonium n-butyltrianisyl borate, tetrabutylammonium n-octyltrianisyl borate, tetrabutylammonium n-dodecyltrianisyl borate, tetraoctylammonium methyltriphenyl borate, tetraoctylammonium n-butyltriphenyl borate, tetraoctylammonium n-octyltriphenyl borate, tetraoctylammonium n-dodecyltriphenyl borate, tetraoctylammonium methyltri-p-tolyl borate, tetraoctylammonium n-butyltri-p-tolyl borate, tetraoctylammonium n-octyltri-p-tolyl borate, tetraoctylanmmonium n-dodecyltri-p-tolyl borate, tetraoctylammonium methyltrianisyl borate, tetraoctylammonium n-butyltrianisyl borate, tetraoctylammonium n-octyltrianisyl borate, tetraoctylammonium n-dodecyltrianisyl borate, tetramethylammonium dimethyldiphenyl borate, tetramethylammonium di-n-butyldiphenyl borate, tetramethylammonium di-n-octyldiphenyl borate, tetramethylammonium di-n-dodecyldiphenyl borate, tetramethylammonium dimethyldi-p-tolyl borate, tetramethylammonium di-n-butyldi-p-tolyl borate, tetramethylammonium di-n-octyldi-p-tolyl borate, tetramethylammonium di-n-dodecyldi-p-tolyl borate, tetramethylammonium dimethyldianisyl borate, tetramethylammonium di-n-butyldianisyl borate, tetramethylammonium di-n-octyldianisyl borate, tetramethylammonium di-n-dodecyl-dianisyl borate, tetraethylammonium dimethyldiphenyl borate, tetraethylammonium di-n-butyldiphenyl borate, tetraethylammonium di-n-octyldiphenyl borate, tetraethylammonium di-n-dodecyldiphenyl borate, tetraethylammonium dimethyldi-p-tolyl borate, tetraethylammonium di-n-butyldi-p-tolyl borate, tetraethylammonium di-n-octyldi-p-tolyl borate, tetraethylammonium di-n-dodecyldi-p-tolyl borate, tetraethylammonium dimethyldianisyl borate, tetraethylammonium di-butyldianisyl borate, tetraethylammonium di-n-octyldianisyl borate, tetraethylammonium di-n-dodecyldianisyl borate, tetrabutylammonium dimethyldiphenyl borate, tetrabutylammonium di-n-butyldiphenyl borate, tetrabutylammonium di-n-octyldiphenyl borate, tetrabutylammonium di-n-dodecyldiphenyl borate, tetrabutylammonium dimethyldi-p-tolyl borate, tetrabutylammonium di-n-butyldi-p-tolyl borate, tetrabutylammonium di-n-octyldi-p-tolyl borate, tetrabutylammonium di-n-dodecyldi-p-tolyl borate, tetrabutylammonium dimethyldianisyl borate, tetrabutylammonium di-n-butyldianisyl borate, tetrabutylammonium di-n-octyldianisyl borate, tetrabutylammonium di-n-dodecyldianisyl borate, tetraoctylammonium dimethyldiphenyl borate, tetraoctylammonium di-n-butyldiphenyl borate, tetraoctylammonium di-n-octyldiphenyl borate, tetraoctylammonium di-n-dodecyldiphenyl borate, tetraoctylammonium dimethyl-di-p-tolyl borate, tetraoctylammonium di-n-butyl-di-p-tolyl borate, tetraoctylammonium di-n-octyldi-p-tolyl borate, tetraoctylammonium di-n-dodecyldi-p-tolyl borate, tetraoctylammonium dimethyldianisyl borate, tetraoctylammonium di-n-butyldianisyl borate, tetraoctylammonium di-n-octyldianisyl borate, tetraoctylammonium di-n-dodecyldianisyl borate, tetrametylammonium tetraphenyl borate, tetraethylammonium tetraphenyl borate, tetrabutylammonium tetraphenyl borate, tetraoctylammonium tetraphenyl borate, tetramethylammonium tetra-p-tolyl borate, tetraethylammonium tetra-p-tolyl borate, tetrabutylammonium tetrap-tolyl borate, tetraoctylammonium tetra-p-tolyl borate, tetramethylammonium tetraanisyl borate, tetraethylammonium tetraanisyl borate, tetrabutylammonium tetraanisyl borate, tetraoctylammonium tetraanisyl borate, tetramethylammonium triphenylnaphthyl borate, tetraethylammonium triphenylnaphthyl borate, tetrabutylammonium triphenylnaphthyl borate, tetramethylammonium tri-p-tolylnaphthyl borate, tetraethylammonium tri-p-tolylnaphthyl borate, tetrabutylammonium tri-p-tolyl naphthyl borate, tetramethylammonium tetrabutyl borate, tetraethylammonium tetrabutyl borate, tetrabutylammonium tetrabutyl borate, trimethylhydrogenammonium n-butyltriphenyl borate, triethylhydrogenammonium n-butyltriphenyl borate, trimethylhydrogenammonium n-butyltrianisyl borate, triethylhydrogenammonium n-butyltrianisyl borate, tetrahydrogenammonium n-butyltriphenyl borate, tetrahydrogenammonium n-butyltrianisyl borate, tetramethylammonium tri-n-butyl (triphenylsilyl) borate, tetraethylammonium tri-n-butyl (triphenylsilyl) borate, tetrabutylammonium tri-n-butyl (triphenylsilyl) borate, tetramethylammonium tri-n-butyl (dimethylphenylsilyl) borate, tetraethylammonium tri-n-butyl (dimethylphenylsilyl) borate, tetrabutylammonium tri-n-butyl(dimethylphenylsilyl) borate, tetramethylammonium n-octyldiphenyl (di-n-butylphenylsilyl) borate, tetraethylammonium n-octyldiphenyl(di-n-butylphenylsilyl) borate, tetramethylammonium dimethylphenyl(trimethylsilyl) borate, tetraethylammonium dimethylphenyl(trimethylsilyl) borate, tetrabutylammonium dimethylphenyl (trimethylsilyl) borate, methylpyridinium n-butyltriphenyl borate, methylpyridinium n-octyltriphenyl borate, methylpyridinium n-dodecyltriphenyl borate, ethylpyridinium n-butyltriphenyl borate, ethylpyridinium n-octyltriphenyl borate, ethylpyridinium n-dodecyltriphenyl borate, n-butylpyridinium n-butyltriphenyl borate, n-butylpyridinium n-octyltriphenyl borate, n-butylpyridinium n-dodecyltriphenyl borate, n-octhylpyridinium, n-butyltriphenyl borate, n-octylpyridinium n-octyltriphenyl borate, n-octylpyridinium, n-dodecyltriphenyl borate, methylpyridinium n-butyltri-p-tolyl borate, methylpyridinium n-octyltri-p-tolyl borate, methylpyridinium n-dodecyltri-p-tolyl borate, ethylpyridinium n-butyltri-p-tolyl borate, ethylpyridinium n-octyltri-p-tolyl borate, ethylpyridinium n-dodecyltri-p-tolyl borate, n-butylpyridinium n-butyl tri-p-tolyl borate, n-butylpyridinium n-octyltri-p-tolyl borate, n-butyl pyridinium n-dodecyltri-p-tolyl borate, n-octylpyridinium n-butyltri-p-tolyl borate, n-octylpyridinium n-octyltri-p-tolyl borate, n-octylpyridinium n-dodecyltri-p-tolyl borate, methylpyridinium n-butyltrianisyl borate, methylpyridinium n-octyltrianisyl borate, methylpyridinium n-dodecyltrianisyl borate, ethylpyridinium n-butyltrianisyl borate, ethylpyridinium n-octyltrianisyl borate, ethylpyridinium n-dodecyltrianisyl borate, n-but ylpyridinium n-but yltrianisyl borate, n-butylpyridinium n-octyltrianisyl borate, n-butylpyridinium n-dodecyltrianisyl borate, n-octylpyridinium n-butyltrianisyl borate, n-octylpyridinium n-octyltrianisyl borate, n-octylpyridinium n-dodecyltrianisyl borate, methylquinolinium n-butyltriphenyl borate, methylquinolinium n-octyltriphenyl borate, methylquinolinium n-dodecyltriphenyl borate, ethylquinolinium n-butyltriphenyl borate, ethylquinolinium n-octyltriphenyl borate, ethylquinolinium n-dodecyltriphenyl borate, n-butylquinolinium n-butyltriphenyl borate, n-butylquinolinium n-octyltriphenyl borate, n-butylquinolinium n-dodecyltriphenyl borate, n-octylquinolinium n-butyltriphenyl borate, n-octylquinoinium n-octyltriphenyl borate, n-octylquinolinium n-dodecyltriphenyl borate, methylquinolinium n-butyl tri-p-tolyl borate, methylquinolinium n-octyltri-p-tolyl borate, methylquinolinium n-dodecyltri-p-tolyl borate, ethylquinolinium n-butyltri-p-tolyl borate, ethylquinolinium n-octyltri-p-tolyl borate, ethylquinolinium n-dodecyltri-p-tolyl borate, n-butylquinolinium n-butyltri-p-tolyl borate, n-butylquinolinium n-octyltri-p-tolyl borate, n-butylquinolinium n-dodecyltri-p-tolyl borate, n-butylquinolinium n-butyltri-p-tolyl borate, n-octylquinolinium n-octyltri-p-tolyl borate, n-octylquinolinium n-dodecyltri-p-tolyl borate, methylquinolinium n-butyltrianisyl borate, methylquinolinium n-octyltrianisyl borate, methylquinolinium n-dodecyltrianisyl borate, ethylquinolinium n-butyltrianisyl borate, ethylquinolinium n-octyltrianisyl borate, ethylquinolinium n-dodecyltrianisyl borate, n-butylquinolinium n-butyltrianisyl borate, n-butylquinolinium n-octyltrianisyl borate, n-butylquinolinium n-dodecyltrianisyl borate, n-octylquinolinium n-butyltrianisyl borate, n-octylquinolinium n-octyltrianisyl borate, n-octylquinolinium n-dodecyltrianisyl borate, methylpyridinium di-n-butyldiphenyl borate, ethylpyridinium di-n-octyldiphenyl borate, n-butylpyridinium di-n-dodecyldiphenyl borate, n-octylpyridinium di-n-butyldiphenyl borate, methylpyridinium di-n-butyl di-p-tolyl borate, ethylpyridinium di-n-octyldi-p-tolyl borate, n-butylpyridinium di-n-dodecyl-di-p-tolyl borate, n-octylpyridinium di-n-butyldi-p-tolyl borate, methylpyridinium di-n-octyldianisyl borate, ethylpyridinium di-n-octyldianisyl borate, n-butylpyridinium di-n-dodecyldianisyl borate, n-octylpyridinium di-n-butyldianisyl borate, methylquinolinium di-n-butyldiphenyl borate, ethylquinolinium di-n-octyldiphenyl borate, n-butylquinolinium di-n-dodecyldiphenyl borate, n-octylquinolinium di-n-butyldiphenyl borate, methylquinolinium di-n-butyldi-p-tolyl borate, ethylquinolinium di-n-octyldi-p-tolyl borate, n-butylquinolinium di-n-dodecyldi-p-tolyl borate, n-octylquinolinium di-n-butyldi-p-tolyl borate, methylquinolinium di-n-butyldianisyl borate, ethylquinolinium di-n-octyldianisyl borate, n-butylquinolinium di-n-dodecyldianisyl borate, n-octylquinolinium di-n-butyldianisyl borate, methylpyridinium tetra-n-butyl borate, ethylpyridinium tetra-n-butyl borate n-butylpyridinium tetra-n-butyl borate, n-octylpyridinium tetra-n-butyl borate, methylquinolinium tetra-n-butyl borate, ethylquinolinium tetra-n-butyl borate, n-butylquinolinium tetra-n-butyl borate, n-octylquinolinium tetra-n-butyl borate, methylpyridinium tetra-n-octyl borate, ethylpyridinium tetra-n-octyl borate, n-butylpyridinium tetra-n-octyl borate, n-octylpyridinium tetra-n-octyl borate, methylquinolinium tetra-n-octyl borate, ethylquinolinium tetra-n-octyl borate, n-butylquinolinium tetra-n-octyl borate, n-octylquinolinium tetra-n-octyl borate, tetramethylphosphonium n-butyltriphenyl borate, tetraethylphosphonium n-butyltriphenyl borate, tetra-n-butylphosphonium n-butyltriphenyl borate, tetra-n-octylphosphonium, n-butyltriphenyl borate, tetramethylphosphonium n-butyltri-p-tolyl borate, tetraethylphosphonium n-butyltri-p-tolyl borate, tetra-n-butylphosphonium n-butyltri-p-tolyl borate, tetra-n-octylphosphonium n-butyltri-p-tolyl borate, tetramethylphosphonium n-butyltrianisyl borate, tetraethylphosphonium n-butyltrianisyl borate, tetra-n-butylphosphoniuim n-butyltrianisyl borate, tetra-n-octylphosphoniuim n-butyltrianisyl borate, tetramethylphosphonium n-octyltriphenyl borate, tetraethylphosphonium n-octyltriphenyl borate, tetra-n-but ylphosphonium n-octyltriphenyl borate, tetra-n-octylphosphonium n-octyltriphenyl borate, tetramethylphosphonium n-octyltri-p-tolyl borate, tetraethylphosphonium n-octyltri-p-tolyl borate, tetra-n-butylphosphonium n-octyltri-p-tolyl borate, tetra-n-octylphosphonium n-octyltri-p-tolyl borate, tetramethylphosphonium n-octyltrianisyl borate, tetraethylphosphonium n-octyltrianisyl borate, tetra-n-but ylphosphonium n-octyltrianisyl borate, tetra-n-octylphosphonium n-octyltrianisyl borate, tetramethylphosphonium n-dodecyltriphenyl borate, tetraethylphosphonium n-dodecyltriphenyl borate, tetra-n-but ylphosphonium n-dodecyltriphenyl borate, tetra-n-octylphosphonium n-dodecyltriphenyl borate, tetramethylphosphonium n-dodecyltri-p-tolyl borate, tetraethylphosphonium n-dodecyltri-p-tolyl borate, tetra-n-but ylphosphonium n-dodecyltri-p-tolyl borate, tetra-n-octylphosphonium n-dodecyltri-p-tolyl borate, tetramethylphosphonium n-dodecyltrianisyl borate, tetraethylphosphonium n-dodecyltrianisyl borate, tetra-n-but ylphosphonium n-dodecyltrianisyl borate, tetra-n-octylphosphonium n-dodecyltrianisyl borate, tetramethylphosphonium di-n-butyldiphenyl borate, tetraethylphosphonium di-n-butyldiphenyl borate, tetra-n-butylphosphonium di-n-butyldiphenyl borate, tetra-n-octylphosphonium di-n-butyldiphenyl borate, tetramethylphosphonium di-n-butyldi-p-tolyl borate, tetraethylphosphonium di-n-butyldi-p-tolyl borate, tetra-n-butylphosphonium di-n-butyldi-p-tolyl borate, tetra-n-octylphosphonium di-n-butyldi-p-tolyl borate, tetramethylphosphonium n-butyldianisyl borate, tetraethylphosphonium di-n-butyldianisyl borate, tetra-n-butylphosphonium di-n-butyldianisyl borate, tetra-n-octylphosphonium di-n-butyldianisyl borate, tetramethylphosphonium di-n-octyldiphenyl borate, tetraethylphosphonium di-n-octyldiphenyl borate, tetra-n-butylphosphonium di-n-octyldiphenyl borate, tetra-n-octylphosphonium di-n-octyldiphenyl borate, tetramethylphosphonium di-n-octyldi-p-tolyl borate, tetraethylphosphonium di-n-octyldi-p-tolyl borate, tetra-n-butylphosphonium di-n-octyldi-p-tolyl borate, tetra-n-octylphosphonium di-n-octyldi-p-tolyl borate, tetramethylphosphonium di-n-octyldianisyl borate, tetraethylphosphonium di-n-octyldianisyl borate, tetra-n-butylphosphonium di-n-octyldianisyl borate, tetra-n-octylphosphonium di-n-octyldianisyl borate, tetraphenylphosphonium n-butyltriphenyl borate, tetraanisylphosphonium n-butyltriphenyl borate, tetraphenylphosphonium n-butyltri-p-tolyl borate, tetraanisylphosphonium n-butyltri-p-tolyl borate, tetraphenylphosphonium n-butyltrianisyl borate, tetraanisylphosphonium n-butyltrianisyl borate, tetraphenylphosphonium n-butyldiphenyl borate, tetraphenylphosphonium di-n-butyldiphenyl borate, tetraanisylphosphonium di-n-butyldi-p-tolyl borate, tetraphenylphosphonium di-n-butyldi-p-tolyl borate, tetraanisylphosphonium di-n-butyldianisyl borate, tetraanisylphosphonium di-n-butyldianisyl borate, and the like.

The colored dyes having absorptions at wavelengths in the visible region in the present invention are cationic dyes having an ionic bond in the molecule or electrically neutral dyes having no ionic bond in the molecule, which are represented by the general formulae (2) and (3). Typical examples of the colored dyes include merocyanine dyes, xanthene dyes, thioxanthene dyes, indigo dyes, aromatic amine dyes, phthalocyanine dyes, oxazine dyes, thiazine dyes, azo dyes, quinone dyes, cyanine dyes, diaryl methane dyes, triaryl methane dyes, pyrylium dyes, squarillium dyes and the like.

General formula (2)

wherein $D^+$ is a cation having absorptions at a wavelength in a visible region, $R_5$, $R_6$, $R_7$ and $R_8$ independently represents an alkyl, aryl, allyl, aralkyl, alkenyl, alkynyl, silyl, heterocyclic, substituted alkyl, substituted aryl, substituted allyl, substituted aralkyl, substituted alkenyl, substituted alkynyl, or substituted silyl group, respectively.

General formula (3)

$$D^+ \cdot A^-$$

wherein $D^+$ is a cation having absorptions at a wavelength in the visible region, $A^-$ represents an anion.

As the groups $R_5$, $R_6$, $R_7$ and $R_8$ of the general formula (2), there may be mentioned the same groups as the groups $R_1$, $R_2$, $R_3$ and $R_4$ of the general formula (1).

As the anion ($A^-$) composing the cation dyes of the aforesaid general formula (3), there are mentioned anions represented by halogen ions, perchloric acid ions, $PF_6^-$, $BF_4^-$, $SbF_6^-$, sulfonic acid ions, and the like. As concrete examples of the anions, there are mentioned fluorine ion, chlorine ion, bromine ion and iodine ion as halogen ions, and as sulfonic acid ions, there are mentioned e.g., methylsulfonic acid ions such as $CH_3SO_3^-$, substituted methylsulfonic acid ions such as $FCH_2SO_3^-$, $F_2CHSO_3^-$, $F_3CSO_3^-$, $ClCH_2SO_3^-$, $Cl_2CHSO_3^-$, $Cl_3CSO_3^-$, $CH_3OCH_2SO_3^-$, $(CH_3)_2NCH_2SO_3^-$, and the like, phenylsulfonic acid ions such as $C_6H_5SO_3^-$, substituted phenylsulfonic acid ions such as $CH_3C_6H_4SO_3^-$, $(CH_3)_2C_6H_3SO_3^-$, $(CH_3)_3C_6H_2SO_3^-$, $HOC_6H_4SO_3^-$, $(HO)_2C_6H_3SO_3^-$, $(HO)_3C_6H_2SO_3^-$, $CH_3OC_6H_4SO_3^-$, $C_6H_4ClSO_3^-$, $C_6H_3Cl_2SO_3^-$, $C_6H_2Cl_3SO_3^-$, $C_6HCl_4SO_3^-$, $C_6Cl_5SO_3^-$, $C_6H_4FSO_3^-$, $C_6H_3F_2SO_3^-$, $C_6H_2F_3SO_3^-$, $C_6HF_4SO_3^-$, $C_6F_5SO_3^-$, $(CH_3)_2NC_6H_4SO_3^-$, and so forth. As typical examples of such colored dye, there are mentioned e.g. those set forth in Table 1.

TABLE 1

| Dye No. | Structure | $R_1$ | $R_2$ | $R_3$ | $R_4$ | $R_5$ | M | n |
|---|---|---|---|---|---|---|---|---|
| 1 | 4-(4-dimethylaminostyryl)quinoline | | | | | | | |
| 2 | 2-(4-(dimethylamino)buta-1,3-dienyl)quinoline | | | | | | | |
| 3 | 5-chloro-3,3-dimethyl-2-(4-dimethylaminostyryl)-3H-indole | | | | | | | |
| 4 | 5-methoxy-3,3-dimethyl-2-(4-dimethylaminostyryl)-3H-indole | | | | | | | |
| 5 | 3,3-dimethyl-2-(4-dimethylaminostyryl)-3H-indole | | | | | | | |
| 6 | 2-(4-dimethylaminostyryl)benzothiazole | | | | | | | |

TABLE 1-continued
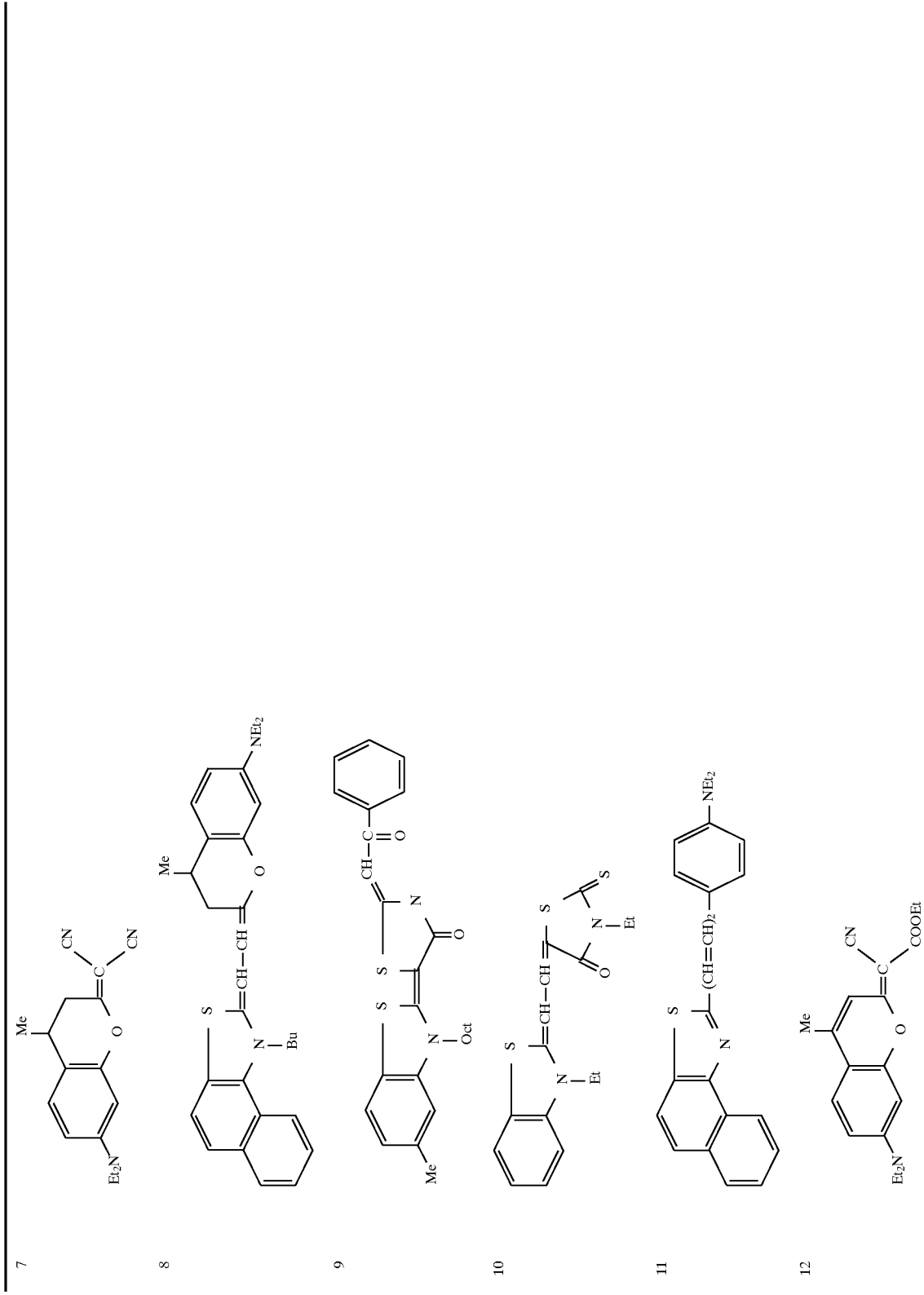

TABLE 1-continued

| | Structure | Variants |
|---|---|---|
| 13 | [coumarin with CF3 and julolidine-type N-Et] | |
| 14 | [coumarin with R1 and julolidine] | A: COMe<br>B: COOEt<br>C: COOPr |
| 15 | [coumarin with R1, phenyl, N, Et2N] | A: H<br>B: Me |
| 16 | [coumarin with S-phenyl, N, Et2N] | |
| 17 | [triphenylmethane dye with NEt2, SO3−, SO3H, Et2N] | |

TABLE 1-continued

| | Structure | | | | | | |
|---|---|---|---|---|---|---|---|
| 18 —A | (rhodamine with R1,R2,R3,COOR4, Cl-) | H | H | H | H | | |
| —B | | Me | H | H | Me | | |
| —C | | Et | Me | H | Me | | |
| —D | | Et | Et | Me | Et | | |
| —E | | H | Et | Me | H | | |
| —F | | Me | Et | Me | Me | | |
| 19 —A | (julolidine-fused rhodamine, ClO4-) | H | | | | | |
| —B | | CN | | | | | |
| —C | | 2-COOH-phenyl | | | | | |
| —D | | 2-COOEt-phenyl | | | | | |
| 20 —A | (structure with R3,R4, NH, COOR5, Br-) | cHex | Me | Me | H | Et | |
| —B | | cHex | Me | Me | H | All | |
| —C | | Et | Et | H | H | Et | |
| —D | | Et | Et | Cl | Cl | All | |
| —E | | Bu | Bu | H | H | Bu | |
| —F | | Tol | Et | Me | H | Bu | |
| —G | | | | | | Bz | |
| 21 —A | (rhodamine with R1,R2,R3, Cl-) | Me | Me | H | | | |
| —B | | Et | Et | H | | | |
| —C | | Me | Me | CN | | | |

TABLE 1-continued

| | | Structure | | | | | |
|---|---|---|---|---|---|---|---|
| 22 | —A<br>—B | (complex fused ring structure with O, N⁺, ClO₄⁻) | H<br>CN | | | | |
| 23 | | Me₂N-anthracene-NMe₂⁺ Br⁻ (with Me, Me) | | | | | |
| 24 | | Me₂N-phenyl-S-naphthalene-NMe₂⁺ SbF₆⁻ | | | | | |
| 25 | —A<br>—B | phenyl-O/N ring with R₁, R₂, R₃ substituents, ClO₄⁻ | Et<br>H | Et<br>Et | | | |
| 26 | —A<br>—B<br>—C<br>—D | naphthyl-O/N ring with R₁–R₅, Cl⁻ | H<br>H<br>Me<br>H | H<br>Et<br>Me<br>Et | H<br>Et<br>Me<br>Et | H<br>H<br>H<br>Me | |
| 27 | —A<br>—B | phenyl-S/N ring with N(R₁)₂, Cl⁻ | H<br>Me | | | | |

TABLE 1-continued

| | | | R₁ | R₂ | R₅ |
|---|---|---|---|---|---|
| 28 | —A | [structure] | H | H | |
| | —B | | Me | | |
| 29 | | [structure] | | | |
| 30 | —A | [structure] | NMe₂ | H | |
| | —B | | H | NH₂ | |
| 31 | | [structure] | | | |
| 32 | | [structure] | | | |
| 33 | | [structure] | | | |

TABLE 1-continued

| | Structure | R₁ | n |
|---|---|---|---|
| 34 | (structure with Me, Cl⁻, NH₂, H₂N, Me, N, N⁺, phenyl) | | |
| 35 | (structure with O, S, N, HO) | | |
| 36 | | | |
| —A | | Me | 0 |
| —B | | Et | 1 |
| —C | | n-Hex | 1 |
| —D | | Me | 2 |
| —E | | Et | 2 |
| —F | | Et | 2 |
| 37 | | | |
| —A | | Me | 0 |
| —B | | Et | 1 |
| —C | | n-Hep | 1 |
| —D | | Me | 2 |
| —E | | Et | 2 |
| —F | | Et | 2 |
| —G | | | |
| 38 | | | |
| —A | | Me | |
| —B | | Me | |
| —C | | Et | |
| —D | | Me | |
| —E | | Et | |
| —F | | n-Hep | |
| 39 | (structure with S, N⁺—Et, BF₄⁻, N—Et) | | |

TABLE 1-continued
| | | | | |
|---|---|---|---|---|
| 40 | —A<br>—B | 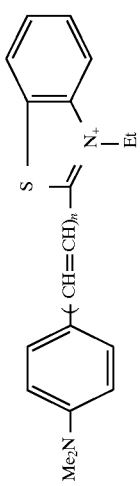 | | 1<br>2 |
| 41 | —A<br>—B | 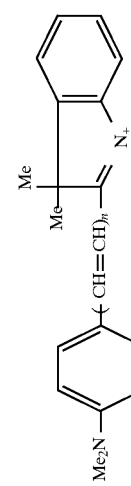 | | 1<br>2 |
| 42 | —A<br>—B<br>—C<br>—D<br>—E<br>—F | 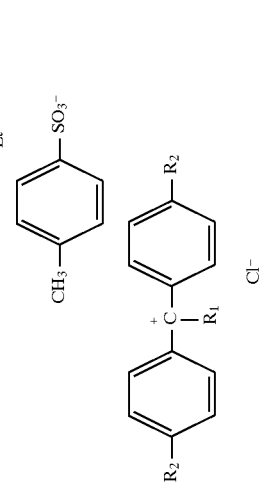 | H<br>Me<br>NH$_2$<br>CN<br>Cl<br>COOH | NMe$_2$<br>NMe$_2$<br>NMe$_2$<br>NMe$_2$<br>NMe<br>H |
| 43 | |  | | |
| 44 | | 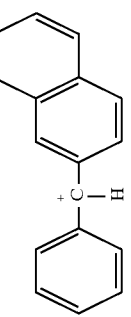 | | |

TABLE 1-continued

| # | Structure | A | B |
|---|---|---|---|
| 45 | bis(thienyl)(4-R₁-phenyl)carbenium Cl⁻ | H | NMe₂ |
| 46 | bis(4-Me₂N-phenyl)(4-Me₂N-phenyl)C=NH | | |
| 47 | tris(4-Me₂N-phenyl)NH⁺ ClO₄⁻ | | |
| 48 | (4-R₁-phenyl)(4-R₂-phenyl)(4-R₃-phenyl)C-OH | OMe | OMe |
|    |  | H | NMe₂ |
| 49 | bis(4-Me₂N-phenyl)(4-NHEt-naphthyl)carbenium Cl⁻ | | |

TABLE 1-continued

| | | | |
|---|---|---|---|
| 50 | — A | (structure: triphenylmethane cation with N(R₁)₂ groups and R₂, Cl⁻ counterion) | Me, H |
| | — B | | Et, OMe |
| | — C | | Me, CN |
| | — D | | Et, NEt₂ |
| | — E | | Et, Cl |
| | — F | | Et, NMe₂ |
| 51 | — A | (bis-benzoxazolone structure with R₁) | H |
| | — B | | Et |
| 52 | — A | (bis-benzothiazolone structure with R₁) | H |
| | — B | | Et |
| 53 | | (bis-naphthalene sulfonamide structure) | |
| 54 | | (bis-pyridine oxazolone structure) | |

TABLE 1-continued

| | | R₁ | n |
|---|---|---|---|
| 55 | —A | H | 0 |
| | —B | Et | 1 |
| | —C | Et | 2 |
| | —D | tBu | 2 |
| | —E | Et | 3 |
| 56 | —A | H | |
| | —B | Ph | |
| | —C | tBu | |

TABLE 1-continued

| | | |
|---|---|---|
| 57 | (macrocyclic tetraimine complex structure with four R₁-substituted benzene rings and central N-M-N) | A — H, Cu<br>B — tBu, Mg<br>C — Ph, Fe<br>D — Ph, Ni<br>E — H, Pb<br>F — H, Co<br>G — tBu, Zn<br>H — Ph, Mn |
| 58 | 2,4,6-triphenylthiopyrylium ClO₄⁻ | |
| 59 | (2-(methylthio)-N-methylanilino)-CH=(2,6-diphenylthiopyrylium) I⁻ | |
| 60 | (2-methoxy-N-methylanilino)-CH=(2,6-diphenylthiopyrylium) BF₄⁻ | |

TABLE 1-continued

| | |
|---|---|
| 61 | [structure with Me, Ph, S, CH=CH—CH, N—Me, I⁻] |
| 62 | [structure with O⁻, CH=, Me—⁺N, phenyl groups] |
| 63 | [structure with Me, ⁺S, CH, ClO₄⁻, phenyl groups] |
| 64 | [structure with =NMe₂, O, O⁻, Me₂N] |
| 65 —A<br>—B | [naphthoquinone structure with R₁, OH, OH] Cl<br>Me |

TABLE 1-continued

| # | Structure | | |
|---|---|---|---|
| 66 | 2-(phenylamino)-1,4-naphthoquinone | | |
| 67 | 2,3-dicyano-5-amino-4a,8a-dihydro-1,4-naphthoquinone | | |
| 68 | A: —S—(phenyl) | | |
| | B: —NH—(phenyl)(2-naphthyl) | | |
| | C: —C₆H₄—NMe₂ (para) | | |
| | D: —C₆H₃(Me)(NEt₂) | | |
| | E: (4-R₁-imino-1-naphthalenone) | | |
| 69 | | R₁ substituents | |
| | A | NH₂ | NH₂, H, H |
| | B | NHMe | H, H, H |
| | C | NMe₂ | H, H, H |

TABLE 1-continued

| | Structure | R₁ | R₂ | R₃ | R₄ |
|---|---|---|---|---|---|
| 70 | anthraquinone core with R₁, R₂, R₃, R₄ | —NH—(phenyl) | H | —NH—(phenyl) | H |
| 71 | 1,4-diamino naphthoquinone with N—B acetyl groups | —NH—(naphthyl) | —NH—(naphthyl) | H | H |
| 72—A | anthraquinone with NH—(2-thiophenyl-phenyl) | —NH—(phenyl) | H | | |
| 72—B | 1-amino-4-hydroxy tetrahydroanthraquinone | —(phenyl)—C₉H₁₉ | | | |

TABLE 1-continued

| Dye No. | Structure | | | | | | | | |
|---|---|---|---|---|---|---|---|---|---|
| 73 | (structure with Me groups, NH₂, =N-) | | | | | | | | |
| 74 | (quinone structure with R₁-R₅) | | R₁ | R₂ | R₃ | R₄ | R₅ | | |
| —A | | NH₂ | H | H | H | H | | | |
| —B | | H | Cl | Cl | H | H | | | |
| —C | | H | Cl | H | H | Cl | | | |
| 75 | (azo structure with NMe₂) | | | | | | | | |
| 76 | (xanthene structure with BuAr₃B⁻) | | R₁ | R₂ | R₃ | R₄ | R₅ | n | X | Ar |
| —A | | | H | H | H | H | | | H | Ph |
| —B | | | H | H | H | Me | | | CN | Ph |
| —C | | | Me | Me | H | Et | | | | Tol |
| —D | | | Et | Et | Me | H | | | | Tol |
| —E | | | H | Et | Me | Me | | | | Ph |
| —F | | | H | | | | | | | Ph |
| 77 | (fused xanthene structure with BuAr₃B⁻) | | | | | | | | | |
| —A | | | | | | | | | | Tol |
| —B | | | | | | | | | | Ph |
| —C | | | | | | | | | | Ph |

Note: Dye 76-F shows a 2-methylbenzoic acid (COOH) substituent group.

TABLE 1-continued

| # | Sub | Structure | | | | | | | |
|---|-----|-----------|---|---|---|---|---|---|---|
| 78 | —D | (COOEt-phenyl structure) | | | | | | | Tol |
| 79 | —A | (xanthene-NMe₂ / XAr₃B⁻) | Me | Me | H | | | | Ph |
|    | —B | | Me | Me | H | | | n-Bu | Tol |
|    | —C | | Et | Et | H | | | n-Hex | Tol |
|    | —D | | Et | Et | H | | | n-Bu | Ph |
|    | —E | | Et | Et | CN | | | n-OCT | Ph |
|    | —F | | Me | Me | | | | n-Hex | Ph |
| 80 | —A | (phenoxazine / BuPh₃B⁻) | c-Hex | Me | Me | H | Et | n-Bu | Tol |
|    | —B | | c-Hex | Me | NMe | H | All | n-Hex | Anisyl |
|    | —C | | Et | Et | Me | H | Et | n-Oct | Ph |
|    | —D | | Et | Et | Cl | Cl | Al | n-Bu | Tol |
|    | —E | | Et | Bu | H | H | Bu | n-Hex | Xylyl |
|    | —F | | Bu | Et | Me | Cl | Bu | n-Oct | Ph |
|    | —G | | Tol | Et | | H | Bz | n-Bu | Tol |
| 81 | —A | (XAr₃B⁻ bis-aryl amine) | Et | Et | H | | | | |
|    | —B | | H | Et | Me | | | | |

TABLE 1-continued

| # | Structure | | | | | | | | |
|---|---|---|---|---|---|---|---|---|---|
| 82 | R₁,R₃-substituted naphthalenone with O and N links, R₄,R₅; BuAr₃B⁻ | | | | | | | | |
| | −A | H | | H | H | H | | | Ph |
| | −B | H | Et | Me | H | H | | | Xylyl |
| | −C | Me | Me | H | Et | H | | | Ph |
| | −D | H | Et | H | Et | Me | | | Tol |
| 83 | (R₁)₂N-substituted ring with S, N; BuPh₃B⁻ | | | | | | | | |
| | −A | H | | | | | | | |
| | −B | Me | | | | | | | |
| 84 | Me/NH₂ cyclohexadiene with N-phenyl; BuPh₃B⁻ | | | | | | | | |
| 85 | Phenoxy iminium with –CH=CH–CH=)ₙ; XAr₃B⁻ | | | | | | | | |
| | −A | Me | | | | | 0 | n-Hex | Ph |
| | −B | Et | | | | | 1 | n-Bu | Anisyl |
| | −C | n-Hex | | | | | 1 | -Bu | Ph |
| | −D | n-Hex | | | | | 1 | n-Hex | Anisyl |
| | −E | n-Hex | | | | | 1 | n-Oct | Ph |
| | −F | Me | | | | | 2 | n-Bu | Tol |
| | −G | Et | | | | | 2 | n-Bu | Ph |
| | −H | Et | | | | | 2 | n-Hex | Xylyl |
| | −I | Et | | | | | 2 | n-Oct | Ph |
| | −J | Et | | | | | 3 | n-Bu | Ph |
| 86 | Phenylthio iminium with –CH=CH–CH=)ₙ; XAr₃B⁻ | | | | | | | | |
| | −A | Me | | | | | 0 | n-Hex | Ph |
| | −B | Et | | | | | 1 | Me | Anisyl |
| | −C | Et | | | | | 1 | n-Bu | Ph |
| | −D | n-Hep | | | | | 1 | n-Hex | Anisyl |
| | −E | Me | | | | | 2 | n-Bu | Ph |
| | −F | Me | | | | | 2 | Me | Tol |
| | −G | Et | | | | | 2 | n-Bu | Ph |
| | −H | Et | | | | | 2 | n-Hex | Anisyl |
| | −I | Et | | | | | 2 | n-Oct | Ph |
| | −J | Et | | | | | | | |

TABLE 1-continued
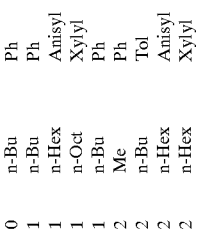
| | | | | | |
|---|---|---|---|---|---|
| 87 | —A | Me | | 0 | Ph |
| | —B | Me | | 1 | n-Bu Ph |
| | —C | Me | | 1 | n-Bu Anisyl |
| | —D | n-Hep | | 1 | n-Hex Xylyl |
| | —F | Me | | 1 | n-Oct Ph |
| | —G | Me | | 2 | Me Ph |
| | —H | Me | | 2 | n-Bu Tol |
| | —I | n-Hep | | 2 | n-Hex Anisyl |
| | —J | Me | | 2 | n-Hex Xylyl |
| | —K | Me | | 3 | n-Bu Ph |
| 88 | —A | | | | |
| | —B | | | | |
| 89 | —A | | | 1 | n-Bu Ph |
| | —B | | | 2 | n-Hex Anisyl |
| 90 | —A | | | 1 | n-Bu Tol |
| | —B | | | 1 | n-Bu Anisyl |
| | —C | | | 2 | n-Bu Anisyl |
| | —D | | | 2 | n-Oct Ph |
| | —E | | | 2 | |
| 91 | —A | H | NMe₂ | | Ph |
| | —B | Me | NMe₂ | | Ph |
| | —C | NH₂ | NMe₂ | | Anisyl |
| | —D | CN | NMe₂ | | Ph |
| | —E | Cl | NMe₂ | | Tol |
| | —F | COOH | H | | Ph |
| 92 | | | | | |

TABLE 1-continued

| # | Structure | | | | |
|---|---|---|---|---|---|
| 93 | 9-phenyl-10-anthracenylmethylium, BuPh₃B⁻ | | | | |
| 94 | bis(2-thienyl)(4-R₁-phenyl)methylium, BuAr₃B⁻ | R₁ | | | Ar |
| | —A | H | | | Ph |
| | —B | NMe₂ | | | Ph |
| | —C | NMe₂ | | | Anisyl |
| 95 | tris[4-(NR₁R₁)-phenyl / 4-R₂-phenyl]methylium, XAr₃B⁻ | R₁ | R₂ | X | Ar |
| | —A | Me | H | n-Bu | Ph |
| | —B | Et | OMe | n-Hex | Anisyl |
| | —C | Me | CN | n-Oct | Ph |
| | —D | Et | NEt₂ | n-Bu | Ph |
| | —E | Et | Cl | n-Hex | Anisyl |
| | —F | Me | NMe₂ | n-Bu | Tol |
| 96 | tris(4-NMe₂-phenyl)ammonium | | | | |

TABLE 1-continued

| | | | |
|---|---|---|---|
| 97 | (structure with Me₂N, NMe₂, NMet, Ph groups) n-HexPh₃B⁻ | | |
| 98 | (Ph, S⁺, Ph structure) BuPh₃B⁻ | | |
| 99 | —A<br>—B<br>—C | n-Bu<br>n-Hex<br>n-Oct | Tol<br>Anisyl<br>Ph | XAr₃B⁻
| 100 | —A<br>—B<br>—C | n-Bu<br>n-Hex<br>n-Oct | Ph<br>Anisyl<br>Ph | XAr₃B⁻
| 101 | —A<br>—B<br>—C | n-Bu<br>n-Hex<br>n-Oct | Ph<br>Anisyl<br>Ph | XAr₃B⁻

TABLE 1-continued

| | | | |
|---|---|---|---|
| 102 | —A<br>—B<br>—C | [structure: methyl-substituted thioxanthylium/thiopyrylium cation with CH linker to benzothiopyran; counterion BuAr₃B⁻] | Ph<br>Anisyl<br>Ph |

In Table 1,
1) Me represents a methyl group.
2) Et represents an ethyl group.
3) n-Pr represents an n-butyl group.
4) n-Bu represents an n-butyl group.
5) t-Bu represents a t-butyl group.
6) n-Hex represents an n-hexyl group.
7) n-Hex represents a cychlohexyl group.
8) n-Hep represents an n-heptyl group.
9) n-Oct represents an n-octyl group.
10) All represents an allyl group.
11) Ph represents a phenyl group.
12) Bz represents a benzyl group.
13) Tol represents a toluyl group.
14) Anisy represents an anisyl group.
15) OMe represents a methoxy group.

These colored dyes and boron compounds may be used each separately or in a combination of two or more of them.

The waxes among the base materials usable in the present invention are those generally used in thermal transferring sheets and inks, including, for example, carbana wax and Japanese wax, which are vegetable waxes, beeswax and wool wax, which are animal waxes, paraffin wax and microcrystalline wax, which are mineral waxes; and polyethylene waxes, polypropylene waxes, chlorinated paraffin, fatty acid amides and the like, which are synthetic waxes, and so forth.

The resins usable in the present invention are all conventional resins, and include, for example, normal temperature drying and curing resins, moisture curing resins for coating, thermal curing resins for coating, resins for toner, and the like, which are capable of e.g. brushing, spray coating, dip coating, gravure coating, doctor coating, roll coating, electrostatic coating, powder coating, transferring, printing, etc. Concrete examples of these resins include oil varnish, boiled oil, shellac, cellulosic resins, phenolic resins, alkyd resins, amino resins, xylene resins, toluene resins, vinyl chloride resins, vinylidene chloride resins, vinyl acetate resins, polystyrene resins represented by polystyrene and the like, (meth)acrylic resins represented by polyolefine resins, polyvinyl-butyral resins, polymethyl methacrylate and the like; polyester resins represented by diallyl phthalate resins, epoxy resins, polyurethane resins, unsaturated polyesters, and the like; polyether resins, polyvinyl alcohol resins, aniline resins, furan resins, polyamide resins, silicone resins, fluorine resins, and the like. These resins can be used singly or in a mixture of two or more of them. In addition, the base material according to the present invention is not limited to the above resins, and any may be used, so long as the light decolorizable recording material can be mixed therewith by dissolution or dispersion.

In the light decolorizable recording material of the present invention, the absorptions of the colored dye having absorptions at a wavelength of visible light region ranging from 400 to 780 nm irradiate visible light by being used combinedly with a boron compound, so that the absorptions within the visible light region disappear and the colored dye is decolorized. The reason why is considered to be that organic boron anion, which is the anion portion of the boron compound, is photosensitized by the colored dye, whereby the anion portion is decomposed to produce a radical, and the radical reacts with the colored dye, so that the absorptions of the coloring matter disappear. It is also considered that when the colored dye is a cation dye represented by the general formula (3), by the combined use thereof with a boron compound, the anion of said colored dye and that of the boron compound cause an ion exchange reaction, whereby a cation dye having a boron anion as represented by the general formula (2) is produced in the system.

The colored dye having absorptions in the visible light region, which composes the light decolorizable recording material of the present invention can be blended with the aforesaid base material in a proportional amount ranging from 0.01 to 90% by weight, preferably from 0.5 to 50% by weight. On the other hand, the boron compound can be blended with the colored dye in a proportional amount ranging from 0.01 to 20% by weight, preferably 0.1 to 10% by weight, based on 1% by weight of the colored dye. These light decolorizable recording materials can be used by mixing them with the base material by dissolving them by the use of a solvent or by mixing them by melting. However, the light decolorizable recording material of the present invention can exhibit the same effect even when the recording material itself is dissolved or dispersed in a solvent and the obtained solution is coated or set. Further, if necessary, a general dye and pigment for coloration may be blended, and in this case, after the light decolorizable recording material having been decolorized by the irradiation of visible light, only the colors of the dye and pigment for coloration can be remained.

The colored dye and boron compound used in the light decolorizable recording material can be used not only singly but in a combination of a plurality thereof.

Although the colored dye composing the light decolorizable recording material of the present invention has sensitivity to a visible light, there is obtained a composition stable under the visible light-containing light of a fluorescent lamp or the like by mixing the recording material with the aforesaid base material, and after the obtained composition having been set or printed on paper, plastics, metal or the like, the set or printed portion cannot be decolorized until a visible light-containing light is irradiated to this set or printed portion from a light source such as a halogen lamp, Xenon lamp, light emitting diode and laser, setting or printing can be conducted again on this decolorized portion. In addition, when a visible light is irradiated to the light decolorizable recording material of the present invention so as to decolorize the recording material, the decolorization rate can be accelerated by heating the material when it is being decolorized. Further, in the light decolorizable recording material of the present invention, the colored dye and boron compound composing the recording material can be separately used, too. That is, even when a composition obtainable by mixing the colored dye with the base material and a composition obtainable by mixing a boron compound with the base material are separately prepared, and after setting or printing has been conducted with the composition with the colored dye mixed, the composition with the mixed boron compound is applied to the set or printed portion and visible light is irradiated to this portion, there can be obtained the same effect as above. The light decolorizable recording material of the present invention can be used not only as a toner for electrophotographic recording or electrostatic recording or inks for printing and sublimating or melting transfer printer, but also for stationary writing materials such as an ink for serial printer, an ink for ink ribbon, an ink for ink jet printer, a ball point pen, a marker, a magic marker and pencils, or for an UV curing ink, paint or the like. However, it is to be noted that the applications of the light decolorizable recording material are not limited to these examples.

The aforesaid toner for electrophotographic recording is prepared by kneading or dispersing, into a base material such as a binder for toner, a combination of the aforesaid colored dye and a boron compound of the general formula (1), and if necessary, an electric charge regulator, and fillers such as titanium white and calcium carbonate, as other additives. The storage stability of the toner can be further improved when an ultraviolet absorbing agent is added.

As the electric charge regulator, there may be used either a positive or negative electric charge regulator which has hitherto been used as a color toner. Examples of positive electric charge regulators are quaternary ammonium salts, alkylamides, hydrophobic silica, etc., and examples of negative electric charge regulators are diaminoanthraquinone, chlorinated polyolefine, chlorinated polyesters, metal salts of naphthenic acid, metal salts of fatty acids, etc.

As fillers, there may be used those such as titanium white, talc, kaolin, silica, alumina, calcium carbonate, aluminium sulfate, barium sulfate, calcium sulfate and calcium phosphalate. The addition of the filler makes it possible to adjust the whiteness after the decolorization. The conventional ultraviolet absorbing agent may be used as the ultraviolet absorbing agent.

As the binders for toner, there are used thermoplastic resins such as polystyrene resins, acrylic resins, styrene-(meth)acrylic ester copolymers, vinyl chloride resins, ethylene-vinyl acetate copolymers, rosin-modified maleic acid resins, phenol resins, epoxy resins, polyester resins, low molecular weight polystyrenes, low molecular weight polypropylenes, ionomer resins, polyurethane resins, silicone resins, ketone resins, xylene resins, polyvinyl butyral resins, etc. Examples of polystyrene resins include polystyrene homopolymers, hydrogenated polystyrenes, styrene-propylene copolymers, styrene-isobutylene copolymers, styrene-butadiene copolymers, styrene-allyl alcohol copolymers, styrene-maleic ester copolymers, styrene-maleic anhydride copolymers, acrylonitrile-butadiene-styrene terpolymers, acrylonitrile-styrene-acrylic ester terpolymers, styrene-acrylonitrile copolymers, acrylonitrile-acrylic rubber-styrene terpolymers, acrylonitrile-chlorinated polyethylene-styrene terpolymers, etc. Examples of acrylic resins include polymethyl methacrylate, ethyl methacrylate, butyl methacrylate, glycidyl methacrylate, fluorine-containing acrylate, methylene methacrylate-butyl methacrylate copolymers, ethyl acrylate-acrylic acid copolymers, etc. Examples of styrene-(meth)acrylate copolymers include styrene-acrylic acid copolymers, styrene-butadiene-acrylic ester terpolymers, styrene-methyl methacrylate copolymers, styrene-butyl methacrylate copolymers, styrene-methyl methacrylate-butyl acrylate terpolymers, styrene-glycidyl methacrylate copolymers, styrene-butadiene-dimethyl aminoethyl methacrylate terpolymers, styrene-acrylic ester-maleic ester terpolymers, styrene-butyl acrylate-acrylic acid terpolymers, etc.

The colored dye composing the light decolorizable recording material, said dye being a colorant for the aforesaid toner, may be blended with the binder for toner in a proportional amount ranging from 0.01 to 90% by weight, preferably from 0.5 to 50% by weight. The boron compound may be blended in a proportional amount ranging from 0.01 to 20% by weight based on 1% by weight of the colored dye, preferably from 0.1 to 10% by weight.

The electric charge regulator can be added in an amount sufficient to adjust the electric charge amount of toner, within the range between 0.1 and 20% by weight based on the weight of the binder for toner. The filler can be blended in a proportional amount ranging from 0.1 to 20% by weight, preferably from 0.1 to 5% by weight based on the weight of the binder for toner. The ultraviolet absorbing agent can be blended in a proportional amount ranging from 0.1 to 20 wt % by weight based on the weight of the binder for toner.

The processes for preparing the aforesaid toner include a solution process and a melting process. The solution process is a process, wherein the aforesaid colored dye and boron compound are dissolved and kneaded in the binder for a toner with an organic solvent, and if required, an electric charge regulator, an ultraviolet absorbing agent or the like is blended, dissolved and kneaded in the binder for toner with an organic solvent, and if added, the fillers are dispersed and kneaded by a paint conditioner, so as to prepare a resin mixture, and after the organic solvent has been removed from the thus obtained resin mixture, a toner is prepared by coarsely pulverizing the resin mixture by a hammer mill, a cutter mill or the like, followed by a fine pulverization by a jet mill or the like. The melting process is a process wherein the aforesaid colored dye and boron compound are melted and kneaded in the binder for a toner, and if required, an electric charge regulator, ultraviolet absorbing agent, fillers and the like are blended, kneaded, and thereafter cooled, whereafter the resulting mixture is pulverized in the same manner as for the solvent process, so as to prepare a toner. The toner obtained as described above can be used not only as a one-component type toner but also as a two-component type toner.

After the above toner has been set or printed on paper or an OHP film and then fixed, the color of the colored dye can be died out by irradiating a visible light-containing light to the set or printed portion from a light source such as a halogen lamp, Xenon lamp, light emitting diode and laser, so that the set or printed portion can be decolorized. Furthermore, the decolorized portion can be repeatedly set or printed with the aforesaid toner or a conventional black toner. In addition, in the above toner, it is possible to separately use the colored dye and boron compound composing said toner. That is, even when a toner with only the colored dye kneaded with the above toner and a composition with only a boron compound kneaded with the base material are separately prepared, and after setting has been conducted with the toner with only the colored dye kneaded with the aforesaid dye, the composition with the boron compound kneaded with the base material is applied to the set portion, and then a visible light is irradiated thereto, there is obtained the same effect as described above.

In addition, the light decolorizable recording material of the present invention can be used also for an ink. The ink is prepared by kneading the aforesaid colored dye and boron compound as coloring agent with the base material for fixation thereof to a set surface, and if required, by dispersing and kneading fillers such as titanium white and calcium carbonate, as other additives. The storage stability can be further improved when an ultraviolet absorbing agent is added. The base material used in this ink comprises a drying oil which is comparatively rapidly dried when left standing in the air, a resin for improving the drying characteristics, gloss, transition characteristics, etc., and a solvent which imparts the required viscosity and fluidity, and the like. However, if necessary, the light decolorizable recording material of the present invention can be used by being dissolved only in a solvent, or in such a state that the colored dye and boron compound are dispersed in a solvent having poor solubility.

As the dry oils, there are mentioned linseed oil, china wood oil, soybean oil, castor oil, and the like. As resins, there are mentioned natural resin derivatives such as cured rosin, rosin esters, maleic acid resins and fumaric acid resins; synthetic resins such as phenol resins, urea-melamine resins, ketone resins, polyvinyl chloride resins, vinyl chloride-vinyl acetate copolymerized resins, butyral resins, styrene-maleic acid resins, styrene-(meth)acrylic ester copolymerized resins, chlorinated polypropylene, acrylic resins, polyester resins, polyamide resins, epoxy resins, polyurethane resins, and nitrocellulose.

As the solvents, there are mentioned aliphatic hydrocarbons such as hexane and heptane; aromatic hydrocarbons such as toluene and xylene; alcohols such as methyl alcohol, ethyl alcohol, propyl alcohol, isopropyl alcohol, butyl alcohol, cyclohexyl alcohol, and benzyl alcohol; glycols such as diethylene glycol, dipropylene glycol, triethylene glycol, polyethylene glycol, propylene glycol, dipropylene glycol, glycerine, polyalkylene glycol, hexylene glycol, and phenyl glycol; glycol derivatives such as ethylene glycol monomethyl ether, ethylene glycol monoethyl ether, ethylene glycol monobutyl ether, ethylene glycol monophenyl ether, diethylene glycol monoethyl ether, diethylene glycol monobutyl ether, diethylene glycol monophenyl ether, diethylene glycol dimethyl ether diethylene glycol diethyl ether, diethylene glycol diphenyl ether, ethylene glycol monoethyl ether acetate, ethylene glycol monobutyl ether acetate, diethylene glycol monoethyl ether acetate, diethylene glycol monobutyl ether acetate, propylene glycol monomethyl ether, propylene glycol monoethyl ether, propylene glycol monobutyl ether, propylene glycol pentaerythritol fatty acid ester; esters such as ethyl acetate, isopropyl acetate, butyl acetate, cesyl isooctanoate, sorbitan monostearate, sorbitan monoisostearate, sorbitan monooleate, sorbitan trioleate, polyoxyethylene sorbitan monolaurate, polyoxyethylene sorbitan monostearate, polyoxyethylene sorbitan monooleate, ascorbic ester, and castor oil fatty acid ester; waxes such as polyolefin wax, carnauba wax, and paraffin wax; liquid paraffin, water, and the like.

Fillers similar to those used for the aforesaid toner used for electrophotographic recording may be used. Conventional ultraviolet absorbing agents may be used as the ultraviolet absorbing agent.

The colored dye used for this ink may be blended with the aforesaid base material in a proportional amount ranging from 0.01 to 90% by weight, preferably from 0.5 to 50% by weight. The boron compound may be blended in a proportional amount ranging from 0.01 to 20% by weight, preferably from 0.1 to 10% by weight based on 1% by weight of the colored dye. The base material may be optionally blended in accordance with printing method.

Fillers also may be blended with the base material in a proportional amount ranging from 0.1 to 20% by weight, preferably from 0.1 to 5% by weight. The ultraviolet absorbing agent may be blended with the base material in a proportional amount ranging from 0.1 to 20% by weight. This decolorizable ink is prepared by kneading the colored dye and boron compound with the drying oil, and if required, adding and kneading the ultraviolet absorbing agent, fillers, etc.

This ink can be used also for printing, and after having been printed by any of various printing methods such as off-set press printing, letterpress printing, gravure press printing, hole press printing, or a special press printing inclusive of flexographic printing, metal printing, plastic printing, glass printing, transfer paper printing, as well as electric printing by printers such as impact printers or non-impact printers, a visible light-containing light is irradiated to the printed portion from a light source such as a halogen lamp, Xenon lamp, light emitting diode, and laser, so that the color of the aforesaid colored dye can be died out and the printed portion can be thereby decolorized. Further, the thus decolorized portion can be repeatedly printed with this printing ink or a conventional printing ink.

Further, when this ink is to be used as an ink for ink ribbon, the aforesaid colored dye and boron compound are mixed with a base material, and pulverized and dispersed in a solvent by wet pulverization, whereby an ink is prepared. A ribbon made of a synthetic fiber cloth such as nylon 66 is impregnated with the thus prepared ink, and then dried, whereby an ink ribbon is produced. By irradiating a visible light-containing light to a portion of a sheet of paper, which is set or printed by a printer by the use of the thus produced ink ribbon from a light source such as a halogen lamp, Xenon lamp, light emitting diode and laser, whereby the color of the aforesaid colored dye can be died out and the set or printed portion can be decolorized. Further, printing can be repeatedly conducted on this decolorized portion with this printing ink or conventional printing ink. In addition, in the ink for the aforesaid ink ribbon, it is possible to prepare the colored dye and boron compound composing this ink as separate inks, and separately use these inks, as in the aforesaid toner.

As an example of the application of the present recording material to a thermal melt-transfer sheet, a transfer film comprising the aforesaid colored dye and boron compound, calcium carbonate kneaded with chlorinated paraffin wax and others being used as a binder, which is coated on a PET film, is brought into close contact with a recording paper, and transferred and printed by a heated head. This set portion can be decolorized in the same manner as the decolorization of the aforesaid ink.

The present invention will be explained in more detail with reference to the following non-limitative examples.

EXAMPLES 1 to 4

20 parts by weight of polymethyl methacrylate were dissolved in 76 parts by weight of methyl ethyl ketone, and the colored dye and the boron compound listed in Table 2 were dissolved and mixed therein in the amounts set forth in Table 2, to obtain a composition.

EXAMPLES 5 to 10

40 parts by weight of a styrene-butyl methacrylate copolymer (softening point: 72° C.) were dissolved in 50 parts by weight of dichloroethane, and the colored dye and boron compound listed in Table 2 were dissolved and kneaded therein in the amounts set forth in Table 2, to obtain a composition.

EXAMPLE 11 to 14

20 parts by weight of polystyrene were dissolved in 70 parts by weight of toluene, and the colored dye and boron compound listed in Table 2 were dissolved and mixed therein in the amounts set forth in Table 2, to obtain a composition.

EXAMPLES 15 to 20

40 parts by weight of a phenol resin (softening point: 110° C.) were dissolved in 70 parts by weight of veratrole resin, and the colored dye and boron compound listed in Table 2 were dissolved and kneaded therein in the amounts set forth in Table 2, to obtain a composition.

EXAMPLES 21 to 24

In 70 parts by weight of a paraffin wax (melting point: 69° C.), there were thermally melted the colored dye and boron compound listed in Table 2 in the amounts set forth in Table 2, at a temperature of 80° C., to obtain a composition.

EXAMPLES 25 to 27

In 96 parts by weight of a styrene-butyl methacrylate copolymer (softening point: 72° C.), there were dissolved and mixed the colored dye and boron compound listed in Table 2 in the amounts set forth in Table 2, with methylene chloride, and the methylene chloride was eliminated by distillation. The obtained resin mixture was coarsely pulverized with a hammer mill or cutter mill, and then finely pulverized with a jet mill to prepare toner particles.

EXAMPLES 28 to 30

In 96 parts by weight of polystyrene (softening point: 92° C.), there were dissolved and kneaded the colored dye and boron compound listed in Table 2 in the amounts set forth in Table 2, with methylene chloride, and methylene chloride was eliminated by distillation. The obtained resin mixture was coarsely pulverized with a hammer mill or cutter mill, and then finely pulverized with a jet mill to prepare toner particles.

EXAMPLES 31 and 32

In 96 parts by weight of a hydrogenated polystyrene (softening point: 101° C.), there were dissolved and kneaded the colored dye and boron compound listed in Table 2 in the amounts set forth in Table 2, with methylene chloride, and the methylene chloride was eliminated by distillation. The obtained resin mixture was coarsely pulverized with a hammer mill or cutter mill, and then finely pulverized with a jet mill, to prepare toner particles.

EXAMPLES 33 and 40

In 96 parts by weight of a styrene-butyl methacrylate copolymer (softening point: 72° C.), there were dissolved and kneaded, with acetone, the colored dye and boron compound listed in Table 2 in the amounts set forth in Table 2, and the acetone was eliminated by distillation. The obtained resin mixture was coarsely pulverized with a hammer mill or cutter mill, and then finely pulverized with a jet mill to prepare toner particles.

EXAMPLES 41 to 43

In 94 parts by weight of a styrene-butyl methacrylate copolymer (softening point: 72° C.), there were dissolved and kneaded, with methylene chloride, the colored dye, boron compound and electric charge regulator listed in Table 2 in the amounts set forth in Table 2, and the methylene chloride was eliminated by distillation. The obtained resin mixture was coarsely pulverized with a hammer mill or cutter mill, and then finely pulverized with a jet mill to prepare toner particles.

EXAMPLES 44 to 46

In 89 parts by weight of a styrene-butyl methacrylate copolymer (softening point: 72° C.), there were dissolved and kneaded, with methylene chloride, the 35 colored dye, boron compound, electric charge regulator and plasticizer listed in Table 2 in the amounts set forth in Table 2, and the methylene chloride was eliminated by distillation. The obtained resin mixture was coarsely pulverized with a hammer mill or cutter mill, and then finely pulverized with a jet mill, to prepare toner particles.

EXAMPLES 47 to 53

In 94 parts by weight of a styrene-butyl methacrylate copolymer (softening point: 72° C.), there were melted and kneaded, by a biaxial kneader-extruder, the colored dye, boron compound, and electric charge regulator listed in Table 2 in the amounts set forth in Table 2, and then the kneaded mixture was cooled. The obtained kneaded resin was coarsely pulverized with a hammer mill or cutter mill, and then finely pulverized with a jet mill, to prepare toner particles.

EXAMPLES 54 and 55

In 91 parts by weight of polymethyl methacrylate (softening point: 78° C.), there were dissolved and kneaded with methylene chloride, the colored dye, boron compound, and electric charge regulator listed in Table 2 in the amounts set forth in Table 2, and further a methylene chloride dispersion of 3 parts by weight of titanium white were dissolved and kneaded as a filler, and then the methylene chloride was eliminated by distillation. The obtained resin mixture was coarsely pulverized with a hammer mill or cutter mill, and then finely pulverized with a jet mill, to prepare toner particles.

EXAMPLES 56 and 57

In 91 parts by weight of polymethyl methacrylate (softening point: 78° C.), there were melted and kneaded the colored dye, boron compound, and electric charge regulator listed in Table 2 in the amounts set forth in Table 2, and further, 3 parts by weight of titanium white were melted and kneaded as a filler by a biaxial kneader-extruder, and then the kneaded mixture was cooled. Subsequently, the obtained kneaded resin was coarsely pulverized with a hammer mill or cutter mill, and then, finely pulverized with a jet mill, to prepare toner particles.

EXAMPLE 58

In 89 parts by weight of polymethyl methacrylate (softening point: 78° C.), there were dissolved and kneaded with methylene chloride, the colored dye, boron compound, and electric charge regulator listed in Table 2 in the amounts set forth in Table 2, and further, 2 parts by weight of an ultraviolet absorbing agent ("Sumisorb 400" manufactured by Sumitomo Kagaku K.K.) and 3 parts by weight of titanium white as a filler were dissolved and kneaded, and then, the methylene chloride was eliminated by distillation. Subsequently, the obtained resin mixture was coarsely pulverized with a hammer mill or cutter mill, and then, finely pulverized with a jet mill, to prepare toner particles.

EXAMPLES 59 to 63

In 50 parts by weight of linseed oil and 30 parts by weight of a styrene-maleic acid resin (softening point: 70° C.), there were dissolved and kneaded the colored dye and boron compound listed in Table 2 in the amounts set forth in Table 2, to prepare an ink.

EXAMPLES 64 to 67

In 30 parts by weight of soybean oil and 50 parts by weight of a styrene-maleic acid resin (softening point: 700° C.), there were dissolved and kneaded the colored dye and boron compound listed in Table 2 in the amounts set forth in Table 2, to prepare an ink.

EXAMPLES 68 to 70

In 40 parts by weight of soybean oil and 30 parts by weight of an acrylic resin (softening point: 650° C.), there were dissolved and kneaded the colored dye and boron compound listed in Table 2 in the amounts set forth in Table 2, to prepare an ink.

EXAMPLES 71 to 74

In 60 parts by weight of an acrylic resin (softening point: 65° C.), there were kneaded the colored dye, boron compound and solvent listed in Table 2 in the amounts set forth in Table 2, to prepare an ink.

EXAMPLES 75 to 77

In 40 parts by weight of soybean oil and 25 parts by weight of an acrylic resin (softening point: 65° C.), there were kneaded the colored dye, boron compound, solvent and plasticizer listed in Table 2 in the amounts set forth in Table 2, to prepare an ink.

EXAMPLES 78 to 83

With 60 parts by weight of liquid paraffin ("Christol 70" [phonetic] produced by Esso Petroleum Oil Industries Incorporated), 10 parts by weight of ethylene glycol, and 10 parts by weight of "Hilac 110" (ketone resin produced by Hitachi Kasei K.K.), there were blended the colored dye and boron compound listed in Table 2 in the amounts set forth in Table 2, and the obtained mixture was pulverized and dispersed by a ball mill, to prepare an ink.

Comparative Examples 1 and 2

40 parts by weight of a styrene-butyl methacrylate copolymer (softening point: 72° C.) were dissolved in 55 parts by weight of dichloroethane, and the colored dye listed in Table 2 was dissolved and kneaded in the obtained mixture in the amounts set forth in Table 2, so that a composition was obtained.

Comparative Examples 3 and 4

In 98 parts by weight of a styrene-butyl methacrylate copolymer (softening point: 72° C.), there were dissolved and kneaded, with methylene chloride, the colored dye listed in Table 2 in the amount set forth in Table 2, and then, the methylene chloride was eliminated by distillation. The obtained resin mixture was coarsely pulverized with a hammer mill or cutter mill, and then, finely pulverized with a jet mill, to prepare toner particles.

TABLE 2

| | Light Decolorizable Recording Material (Dye No. in Table 1, boron compounds and other additives) | wt-% |
|---|---|---|
| Example 1 | Dye No. 2 | 2 |
| | boron compound (TBAPB) | 2 |
| Example 2 | Dye No. 20-B | 2 |
| | boron compound (TBAPB) | 2 |
| Example 3 | Dye No. 27-B | 2 |
| | boron compound (MPBTB) | 2 |
| Example 4 | Dye No. 38-D | 2 |
| | boron compound (TBABB) | 2 |
| Example 5 | Dye No. 18-D | 5 |
| | boron compound (TMAOPB) | 5 |
| Example 6 | Dye No. 36-B | 5 |
| | boron compound (TBATB) | 5 |
| Example 7 | Dye No. 50-D | 5 |
| | boron compound (TBATB) | 5 |
| Example 8 | Dye No. 78-C | 5 |
| | boron compound (TMHPB) | 5 |
| Example 9 | Dye No. 85-E | 5 |

TABLE 2-continued

| | Light Decolorizable Recording Material (Dye No. in Table 1, boron compounds and other additives) | wt-% |
|---|---|---|
| | boron compound (MPBTB) | 5 |
| Example 10 | Dye No. 87-H | 5 |
| | boron compound (TBAPB) | 5 |
| Example 11 | Dye No. 5 | 5 |
| | boron compound (EQBTB) | 5 |
| Example 12 | Dye No. 18-C | 5 |
| | boron compound (TBATS) | 5 |
| Example 13 | Dye No. 50-F | 5 |
| | boron compound (TBATB) | 5 |
| Example 14 | Dye No. 37-G | 5 |
| | boron compound (TBAPB) | 5 |
| Example 15 | Dye No. 36-E | 5 |
| | boron compound (TPBPB) | 5 |
| Example 16 | Dye No. 38-B | 5 |
| | boron compound (TBATB) | 5 |
| Example 17 | Dye No. 26 | 5 |
| | boron compound (TBAPB) | 5 |
| Example 18 | Dye No. 95-F26 | 5 |
| | boron compound (TBATB) | 5 |
| Example 19 | Dye No. 87-H | 5 |
| | boron compound (TOAMAB) | 5 |
| Example 20 | Dye No. 101-C | 5 |
| | boron compound (MPMAB) | 5 |
| Example 21 | Dye No. 5 | 20 |
| | boron compound (TBAPB) | 10 |
| Example 22 | Dye No. 20-B | 20 |
| | boron compound (TMAPB) | 10 |
| Example 23 | Dye No. 27-B | 20 |
| | boron compound (TBATB) | 10 |
| Example 24 | Dye No. 38-D | 20 |
| | boron compound (TBATS) | 10 |
| Example 25 | Dye No. 36-E | 0.5 |
| | boron compound (TBAPB) | 2 |
| Example 26 | Dye No. 36-E | 2 |
| | boron compound (TBAPB) | 2 |
| Example 27 | Dye No. 36-E | 5 |
| | boron compound (TBAPB) | 2 |
| Example 28 | Dye No. 50-F | 0.5 |
| | boron compound (TBATB) | 2 |
| Example 29 | Dye No. 50-F | 2 |
| | boron compound (TBATB) | 2 |
| Example 30 | Dye No. 50-F | 5 |
| | boron compound (TBATB) | 2 |
| Example 31 | Dye No. 18-C | 2 |
| | boron compound (BPOTB) | 2 |
| Example 32 | Dye No. 35-B | 2 |
| | boron compound (TBABB) | 2 |
| Example 33 | Dye No. 23 | 2 |
| | boron compound (TMAOPB) | 2 |
| Example 34 | Dye No. 37-F | 2 |
| | boron compound (TBAPB) | 2 |
| Example 35 | Dye No. 50-F | 2 |
| | boron compound (TBATB) | 2 |
| Example 36 | Dye No. 41-B | 2 |
| | boron compound (TPHPB) | 2 |
| Example 37 | Dye No. 79 | 2 |
| | boron compound (TBADPB) | 2 |
| Example 38 | Dye No. 85-G | 2 |
| | boron compound (TBATB) | 2 |
| Example 39 | Dye No. 87-H | 2 |
| | boron compound (TBAPB) | 2 |
| Example 40 | Dye No. 90-A | 2 |
| | boron compound (TOAMAB) | 2 |
| Example 41 | Dye No. 15-A | 2 |
| | boron compound (TBAPB) | 2 |
| | electric charge regulator (kayacharge N1. produced by Nippon Kayaku) | 2 |
| Example 42 | Dye No. 20-G | 2 |
| | boron compound (TMAOPB) | 2 |
| | electric charge regulator (kayacharge N1. produced by Nippon Kayaku) | 2 |
| Example 43 | Dye No. 41-B | 2 |
| | boron compound (TBATB) | 2 |
| | electric charge regulator (Bontron E89 produced by Orient Kagaku Kogyo) | 2 |
| Example 44 | Dye No. 25-A | 2 |

TABLE 2-continued

| | Light Decolorizable Recording Material (Dye No. in Table 1, boron compounds and other additives) | wt-% |
|---|---|---|
| | boron compound (TBAPB) | 2 |
| | electric charge regulator (Bontron E89 produced by Orient Kagaku Kogyo) | 2 |
| | plasticizer (dibutyl phthalate) | 5 |
| Example 45 | Dye No. 38-D | 2 |
| | boron compound (TBATS) | 2 |
| | electric charge regulator (Bontron E89 produced by Orient Kagaku Kogyo) plasticizer (ethyl stearate) | 2 |
| | | 5 |
| Example 46 | Dye No. 57-E | 2 |
| | boron compound (TBATB) | 2 |
| | electric charge regulator (Bontron E89 produced by Orient Kagaku Kogyo) | 2 |
| | plasticizer (diethyl terephthalate) | 5 |
| Example 47 | Dye No. 27-B | 2 |
| | boron compound (TBAPB) | 2 |
| | electric charge regulator (kayacharge N1. produced by Nippon Kayaku) | 2 |
| Example 48 | Dye No. 19-D | 2 |
| | boron compound (TBABB) | 2 |
| | electric charge regulator (Bontron E89 produced by Orient Kagaku Kogyo) | 2 |
| Example 49 | Dye No. 21-A | 2 |
| | boron compound (TMAOPB) | 2 |
| | electric charge regulator (kayacharge N1. produced by Nippon Kayaku) | 2 |
| Example 50 | Dye No. 38-D | 2 |
| | boron compound (TBAPB) | 2 |
| | electric charge regulator (kayacharge N1. produced by Nippon Kayaku) | 2 |
| Example 51 | Dye No. 87-H | 2 |
| | boron compound (TPPB) | 2 |
| | electric charge regulator (Bontron E89 produced by Orient Kagaku Kogyo) | 2 |
| Example 52 | Dye No. 95-D | 2 |
| | boron compound (TBATB) | 2 |
| | electric charge regulator (kayacharge N1. produced by Nippon Kayaku) | 2 |
| Example 53 | Dye No. 88 | 2 |
| | boron compound (TBABB) | 2 |
| | electric charge regulator (Bontron E89 produced by Orient Kagaku Kogyo) | 2 |
| Example 54 | Dye No. 27-A | 2 |
| | boron compound (TBAPB) | 2 |
| | electric charge regulator (kayacharge N1. produced by Nippon Kayaku) | 2 |
| Example 55 | Dye No. 15-A | 2 |
| | boron compound (TMHPB) | 2 |
| | electric charge regulator (Bontron E89 produced by Orient Kagaku Kogyo) | 2 |
| Example 56 | Dye No. 50-D | 2 |
| | boron compound (TBATB) | 2 |
| | electric charge regulator (kayacharge N1. produced by Nippon Kayaku) | 2 |
| Example 57 | Dye No. 95-A | 2 |
| | boron compound (TBATS) | 2 |
| | electric charge regulator (kayacharge N1. produced by Nippon Kayaku) | 2 |
| Example 58 | Dye No. 64 | 2 |
| | boron compound (TBAPB) | 2 |
| | electric charge regulator (kayacharge NL. produced by Nippon Kayaku) | 2 |
| Example 59 | Dye No. 20-B | 2 |
| | boron compound (TBAPB) | 10 |
| Example 60 | Dye No. 20-B | 10 |
| | boron compound (TBAPB) | 10 |
| Example 61 | Dye No. 20-B | 20 |
| | boron compound (TBAPB) | 10 |
| Example 62 | Dye No. 5 | 10 |
| | boron compound (TMAPB) | 10 |
| Example 63 | Dye No. 25-A | 10 |
| | boron compound (TBABB) | 10 |
| Example 64 | Dye No. 36-E | 2 |
| | boron compound (TMAOPB) | 10 |
| Example 65 | Dye No. 38-D | 10 |
| | boron compound (TBAPB) | 10 |
| Example 66 | Dye No. 88 | 20 |
| | boron compound (MPBTB) | 10 |
| Example 67 | Dye No. 90-D | 10 |
| | boron compound (TBATS) | 10 |
| Example 68 | Dye No. 20-B | 10 |
| | boron compound (TBAPB) | 10 |
| | solvent (toluene) | 10 |
| Example 69 | Dye No. 27-B | 10 |
| | boron compound (TBABB) | 10 |
| | solvent (ethylene glycol monoethyl ether) | 10 |
| Example 70 | Dye No. 36-E | 10 |
| | boron compound (TMHPB) | 10 |
| | solvent (polyethylene glycol) | 10 |
| Example 71 | Dye No. 38-B | 10 |
| | boron compound (TMAOPB) | 10 |
| | solvent (veratrole) | 20 |
| Example 72 | Dye No. 41-B | 10 |
| | boron compound (TBAPB) | 10 |
| | solvent (ethylene glycol monoethyl ether) | 20 |
| Example 73 | Dye No. 87-D | 10 |
| | boron compound (TBAPB) | 10 |
| | solvent (polyethylene glycol) | 20 |
| Example 74 | Dye No. 95-F | 10 |
| | boron compound (TBATB) | 10 |
| | solvent (ethylene glycol monoethyl ether) | 20 |
| Example 75 | Dye No. 20-B | 10 |
| | boron compound (TBAPB) | 10 |
| | solvent (toluene) plasticizer (dibutyl phthalate) | 10 |
| | | 5 |
| Example 76 | Dye No. 26-D | 10 |
| | boron compound (BPOTB) | 10 |
| | solvent (ethylene glycol monoethyl ether) | 10 |
| | plasticizer (ehtyl stearate) | 5 |
| Example 77 | Dye No. 26-D | 10 |
| | boron compound (TBABB) | 10 |
| | solvent (polyethylene glycol) | 10 |
| | plasticizer (diethyl terephthalate) | 5 |
| Example 78 | Dye No. 21-B | 10 |
| | boron compound (EQBTB) | 10 |
| Example 79 | Dye No. 86-I | 10 |
| | boron compoumd (TBABB) | 10 |
| Example 80 | Dye No. 23 | 10 |
| | boron compound (TBATB) | 10 |
| Example 81 | Dye No. 38-D | 10 |
| | boron compound (TBATB) | 10 |
| Example 82 | Dye No. 87-F | 10 |
| | boron compound (TBAPB) | 10 |
| Example 83 | Dye No. 99-A | 10 |
| | boron compound (TPBPB) | 10 |
| Comp. Exam. 1 | Dye No. 41-B | 5 |
| Comp. Exam. 2 | Dye No. 50-F | 5 |
| Comp. Exam. 3 | Dye No. 18-C | 2 |
| Comp. Exam. 4 | Dye No. 27-B | 2 |

TMAPB: tetramethylammonium n-butyltriphenyl borate
TMOPB: tetramethylammonium n-octyltriphenyl borate
TBAPB: tetrabutylammonium n-butyltriphenyl borate
TOAMAB: tetraoctylammonium methyltrianisyl borate
TBATB: tetrabutylammonium n-butyltri-p-tolyl borate
TMHPB: triethylhydrogenammonium n-butyltriphenyl borate
TBABB: tetrabutylammonium tetra-n-butyl borate
TBATS: tetrabutylammonium tri-n-butyl(dimethylphenylsilyl) borate
TBADPB: tetra-n-butylammonium n-dodecyltriphenyl borate
MPBTB: methylpyridinium n-butyltri-p-tolyl borate
EQBTB: ethylquinolinium n-butyltriphenyl borate
TPBPB: tetrapenylphosphonium n-butyltriphenyl borate
MPMAB: methylpyridinium methyltrianisyl borate
BPOTB: n-butylpyridinium n-octyltri-p-tolyl borate
TPHPB: tetraphenylphosphonium n-hexyltri-p-tolyl borate Preparation of Printed Samples The compositions in Examples 1 to 20 were color-developed and dried on a carton board by the use of an RI tester to a thickness of 10 μm to obtain samples. With respect to the compositions of Examples 21 to 24, a sheet obtained by applying each of the compositions on a polyethylene terephthalate film with a thickness of 3.5 µm by a wire bar to a film thickness of 4.0 µm was transfer printed on a recording paper by a thermal printer at an applied energy of 2.0 mj/dot, so that samples were obtained. The toner particles obtained in Examples 25 to 58 were further subjected to a surface treatment with a hydrophobic silica, and then a carrier was mixed thereto, whereafter the toners were set on a PPC paper by a copying machine for PPC ("LSC-24" produced by Casio Co., Ltd.), to obtain samples. The inks obtained in Examples 59 to 77 were drawn and dried a Carton paper to a thickness of 5 µm by the use of an RI tester, to obtain samples. A ribbon made of nylon 66 was impregnated with the inks obtained in Examples 78 to 83 such that the weight of the inks after drying became of 13 g/m$^2$, and housed, respectively, in a ribbon cassette for "PC-201 H" produced by Nippon Denki K.K., and set on a paper by the use of a PC-201 H printer, to obtain samples. The compositions obtained in Comparative Examples 1 and 2 were drawn and dried on a Carton paper to a thickness of 10 µm , to obtain samples. The toner particles obtained in Comparative Examples 3 and 4 were further subjected to surface treatment with hydrophobic silica, and a carrier was mixed thereto, whereafter these toners were printed on a PPC paper by a copygraph for PPC ("LCS-24" produced by Casio Computor Manufacturing Co., Ltd.), so that samples were obtained.

Evaluation of Decolorizability

After visible light having been irradiated for 2 seconds to the thus obtained samples of Examples 1 to 83 and those of Comparative Examples 1 to 4, by a halogen lamp (0.5 W/cm$^2$) by the use of an infrared cut filter, the image densities of the samples were determined by a Macbeth reflection density meter RD 918, so as to evaluate the decolorizabilities of these samples. The results are set forth in Table 3.

TABLE 3

Evaluation of Decolorizability Image Density (Macbeth Reflection Density)

| Samples | Before Irradiation of Light | After Irradiation of Light |
|---|---|---|
| Example 1 | 0.51 | 0.04 |
| Example 2 | 0.48 | 0.04 |
| Example 3 | 0.53 | 0.05 |
| Example 4 | 0.50 | 0.04 |
| Example 5 | 0.93 | 0.06 |
| Example 6 | 0.90 | 0.07 |
| Example 7 | 0.96 | 0.06 |
| Example 8 | 0.95 | 0.05 |
| Example 9 | 0.93 | 0.05 |
| Example 10 | 0.92 | 0.05 |
| Example 11 | 0.88 | 0.06 |
| Example 12 | 0.90 | 0.06 |
| Example 13 | 0.91 | 0.05 |
| Example 14 | 0.87 | 0.07 |
| Example 15 | 0.93 | 0.06 |
| Example 16 | 0.90 | 0.07 |
| Example 17 | 0.94 | 0.06 |
| Example 18 | 0.94 | 0.05 |
| Example 19 | 0.95 | 0.06 |
| Example 20 | 0.93 | 0.05 |
| Example 21 | 1.40 | 0.09 |
| Example 22 | 1.38 | 0.08 |
| Example 23 | 1.36 | 0.08 |
| Example 24 | 1.39 | 0.09 |
| Example 25 | 0.52 | 0.04 |
| Example 26 | 0.92 | 0.06 |

TABLE 3-continued

Evaluation of Decolorizability Image Density (Macbeth Reflection Density)

| Samples | Before Irradiation of Light | After Irradiation of Light |
|---|---|---|
| Example 27 | 1.46 | 0.09 |
| Example 28 | 0.50 | 0.04 |
| Example 29 | 0.89 | 0.05 |
| Example 30 | 1.48 | 0.09 |
| Example 31 | 0.90 | 0.05 |
| Example 32 | 0.88 | 0.06 |
| Example 33 | 0.90 | 0.06 |
| Example 34 | 0.88 | 0.06 |
| Example 35 | 0.89 | 0.05 |
| Example 36 | 0.86 | 0.06 |
| Example 37 | 0.91 | 0.05 |
| Example 38 | 0.88 | 0.04 |
| Example 39 | 0.96 | 0.05 |
| Example 40 | 0.89 | 0.05 |
| Example 41 | 0.87 | 0.05 |
| Example 42 | 0.91 | 0.05 |
| Example 43 | 0.88 | 0.05 |
| Example 44 | 0.90 | 0.06 |
| Example 45 | 0.92 | 0.06 |
| Example 46 | 0.87 | 0.05 |
| Example 47 | 0.91 | 0.05 |
| Example 48 | 0.90 | 0.06 |
| Example 49 | 0.90 | 0.06 |
| Example 50 | 0.91 | 0.06 |
| Example 51 | 0.88 | 0.04 |
| Example 52 | 0.90 | 0.05 |
| Example 53 | 0.92 | 0.05 |
| Example 54 | 0.93 | 0.06 |
| Example 55 | 0.91 | 0.06 |
| Example 56 | 0.88 | 0.06 |
| Example 57 | 0.90 | 0.05 |
| Example 58 | 0.94 | 0.07 |
| Example 59 | 0.53 | 0.04 |
| Example 60 | 0.96 | 0.07 |
| Example 61 | 1.43 | 0.09 |
| Example 62 | 0.93 | 0.05 |
| Example 63 | 0.91 | 0.06 |
| Example 64 | 0.54 | 0.04 |
| Example 65 | 0.98 | 0.05 |
| Example 66 | 1.47 | 0.09 |
| Example 67 | 0.96 | 0.05 |
| Example 68 | 0.92 | 0.05 |
| Example 69 | 0.89 | 0.06 |
| Example 70 | 0.94 | 0.06 |
| Example 71 | 0.93 | 0.06 |
| Example 72 | 0.91 | 0.05 |
| Example 73 | 0.88 | 0.06 |
| Example 74 | 0.90 | 0.05 |
| Example 75 | 0.90 | 0.06 |
| Example 76 | 0.88 | 0.05 |
| Example 77 | 0.93 | 0.06 |
| Example 78 | 0.89 | 0.05 |
| Example 79 | 0.93 | 0.05 |
| Example 80 | 0.89 | 0.05 |
| Example 81 | 0.90 | 0.06 |
| Example 82 | 0.91 | 0.06 |
| Example 83 | 0.88 | 0.05 |
| Comp. Example 1 | 0.90 | 0.89 |
| Comp. Example 2 | 0.92 | 0.91 |
| Comp. Example 3 | 0.88 | 0.86 |
| Comp. Example 4 | 0.89 | 0.88 |

Evaluation of Image Stability

To the samples of Examples 1 to 83, there was irradiated a light of 1100 luxes of a fluorescent lamp, which correspond to an illuminensce intensity about 3 times as high as the brightness in an ordinary office, for 24 hours, and the image densities of these samples were determined by a Macbeth reflection density meter RD 918, to evaluate the stabilities of images. The results are set forth in Table 4.

TABLE 4

Evaluation of Light Image-Stability Image Density (Macbeth Reflection Density)

| Samples | Before Irradiation of Fluorescent Lamp Light | After Irradiation of Fluorescent Lamp Light |
|---|---|---|
| Example 1 | 0.51 | 0.50 |
| Example 2 | 0.48 | 0.46 |
| Example 3 | 0.53 | 0.51 |
| Example 4 | 0.50 | 0.49 |
| Example 5 | 0.93 | 0.91 |
| Example 6 | 0.90 | 0.88 |
| Example 7 | 0.96 | 0.93 |
| Example 8 | 0.95 | 0.92 |
| Example 9 | 0.93 | 0.91 |
| Example 10 | 0.92 | 0.90 |
| Example 11 | 0.88 | 0.86 |
| Example 12 | 0.90 | 0.88 |
| Example 13 | 0.91 | 0.89 |
| Example 14 | 0.87 | 0.84 |
| Example 15 | 0.93 | 0.90 |
| Example 16 | 0.90 | 0.87 |
| Example 17 | 0.94 | 0.91 |
| Example 18 | 0.94 | 0.91 |
| Example 19 | 0.95 | 0.93 |
| Example 20 | 0.93 | 0.90 |
| Example 21 | 1.40 | 1.38 |
| Example 22 | 1.38 | 1.37 |
| Example 23 | 1.36 | 1.33 |
| Example 24 | 1.39 | 1.36 |
| Example 25 | 0.52 | 0.50 |
| Example 26 | 0.92 | 0.90 |
| Example 27 | 1.46 | 1.44 |
| Example 28 | 0.50 | 0.48 |
| Example 29 | 0.89 | 0.86 |
| Example 30 | 1.48 | 1.45 |
| Example 31 | 0.90 | 0.88 |
| Example 32 | 0.88 | 0.85 |
| Example 33 | 0.90 | 0.87 |
| Example 34 | 0.88 | 0.85 |
| Example 35 | 0.88 | 0.85 |
| Example 36 | 0.86 | 0.85 |
| Example 37 | 0.91 | 0.88 |
| Example 38 | 0.88 | 0.86 |
| Example 39 | 0.96 | 0.82 |
| Example 40 | 0.89 | 0.87 |
| Example 41 | 0.87 | 0.86 |
| Example 42 | 0.91 | 0.88 |
| Example 43 | 0.88 | 0.86 |
| Example 44 | 0.90 | 0.87 |
| Example 45 | 0.92 | 0.89 |
| Example 46 | 0.87 | 0.85 |
| Example 47 | 0.91 | 0.89 |
| Example 48 | 0.90 | 0.87 |
| Example 49 | 0.90 | 0.87 |
| Example 50 | 0.91 | 0.87 |
| Example 51 | 0.88 | 0.86 |
| Example 52 | 0.90 | 0.87 |
| Example 53 | 0.92 | 0.91 |
| Example 54 | 0.93 | 0.91 |
| Example 55 | 0.91 | 0.89 |
| Example 56 | 0.88 | 0.86 |
| Example 57 | 0.90 | 0.88 |
| Example 58 | 0.94 | 0.91 |
| Example 59 | 0.53 | 0.51 |
| Example 60 | 0.96 | 0.94 |
| Example 61 | 1.43 | 1.41 |
| Example 62 | 0.93 | 0.91 |
| Example 63 | 0.91 | 0.89 |
| Example 64 | 0.54 | 0.51 |
| Example 65 | 0.98 | 0.96 |
| Example 66 | 1.47 | 1.45 |
| Example 67 | 0.96 | 0.93 |
| Example 68 | 0.92 | 0.89 |
| Example 69 | 0.89 | 0.88 |
| Example 70 | 0.94 | 0.91 |
| Example 71 | 0.93 | 0.89 |
| Example 72 | 0.91 | 0.88 |
| Example 73 | 0.88 | 0.86 |
| Example 74 | 0.90 | 0.87 |
| Example 75 | 0.90 | 0.88 |
| Example 76 | 0.88 | 0.86 |
| Example 77 | 0.93 | 0.90 |
| Example 78 | 0.89 | 0.86 |
| Example 79 | 0.93 | 0.90 |
| Example 80 | 0.89 | 0.87 |
| Example 81 | 0.90 | 0.87 |
| Example 82 | 0.91 | 0.89 |
| Example 83 | 0.88 | 0.85 |

From the results set forth in Table 3, it may be seen that when a visible light is irradiated to a sample by the use of a halogen lamp, the Macbeth reflection density value indicating a printing density is extremely decreased, and the color of the sample is died out. In addition, it can be seen from the results of Table 4 that even if the light of a fluorescent lamp is irradiated to a sample with a luminous intensity considerably higher than that in an ordinary office, the Macbeth reflection density of the sample is hardly changed, and therefore, the sample has a practical light stability.

According to the present invention, there is provided a light decolorizable recording material, which can be decolorized by a visible light after setting and printing are conducted thereon, and the set and printed portion can be again set and printed, and which has practical light stability even under the light of a fluorescent lamp.

We claim:

1. A decolorizable toner consisting of a light decolorizable recording material said recording material consisting of:
   (i) at least one of a wax and a resin;
   (ii) an electrically neutral dye having absorptions in the visible light region; and
   (iii) a boron compound represented by the general formula (1):

wherein $R_1$, $R_2$ and $R_3$ each independently represent an alkyl group, an aryl group, an allyl group, an aralkyl group, an alkenyl group, an alkynyl group, a silyl group, a substituted alkyl group, a substituted aryl group, a substituted silyl group, or a heterocyclic group; $R_4$ represents an alkyl group, an allyl group, an aralkyl group, an alkenyl group, an alkynyl group, a silyl group, a substituted alkyl group, a substituted silyl group, or a heterocyclic group; and $Z^+$ represents a quaternary ammonium cation, a quaternary pyridinium cation, a quaternary quinolinium cation or a phosphonium cation.

2. A decolorizable toner according to claim 1, wherein the boron compound is present in an amount of 0.01 to 20% by weight based on 1% by weight of the electrically neutral dye.

3. A decolorizable toner according to claim 1, wherein said toner is decolorizable by visible light.

4. A light decolorizable recording material consisting of:

(i) at least one of a wax and a resin;
(ii) an electrically neutral dye having absorptions in the visible light region; and
(iii) a boron compound represented by the general formula (1):

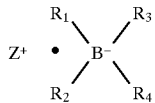
(1)

wherein $R_1$, $R_2$ and $R_3$ each independently represent an alkyl group, an aryl group, an allyl group, an aralkyl group, an alkenyl group, an alkynyl group, a silyl group, a substituted alkyl group, a substituted aryl group, a substituted silyl group, or a heterocyclic group; $R_4$ represents an alkyl group an allyl group, an aralkyl group, an alkenyl group, an alkynyl group, a silyl group, a substituted alkyl group, a substituted silyl group, or a heterocyclic group; and $Z^+$ represents a quaternary ammonium cation, a quaternary pyridinium cation, a quaternary quinolinium cation or a phosphonium cation.

5. A light decolorizable recording material according to claim 4, wherein the boron compound is present in an amount of 0.01 to 20% by weight based on 1% by weight of the electrically neutral dye.

6. A light decolorizable ink consisting of:
(i) at least one of a wax and a resin in combination with an agent selected from the group consisting of a) a solvent and b) a solvent and a drying oil;
(ii) an electrically neutral dye having absorptions in the visible light region; and
(iii) a boron compound represented by the general formula (1):

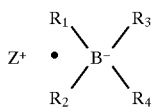
(1)

wherein $R_1$, $R_2$ and $R_3$ each independently represent an alkyl group, an aryl group, an allyl group, an aralkyl group, an alkenyl group, an alkynyl group, a silyl group, a substituted alkyl group, a substituted aryl group, a substituted silyl group, or a heterocyclic group; $R_4$ represents an alkyl group, an allyl group, an aralkyl group, an alkenyl group, an alkynyl group, a silyl group, a substituted alkyl group, a substituted silyl group, or a heterocyclic group; and $Z^+$ represents a quaternary ammmonium cation, a quaternary pyridinium cation, a quaternary quinolinium cation or a phosphonium cation.

7. A decolorizable ink according to claim 6 which is decolorizable by visible light.

8. A decolorizable ink according to claim 6, wherein the boron compound is present in an amount of 0.01 to 20% by weight based on 1% by weight of the electrically neutral dye.

9. A light decolorizable ink according to claim 6, wherein the agent is a solvent and a drying oil.

10. A light decolorizable ink according to claim 6, wherein the agent is a solvent.

* * * * *

UNITED STATES PATENT AND TRADEMARK OFFICE
CERTIFICATE OF CORRECTION

PATENT NO. : 5,846,682
DATED : June 23, 1998
INVENTOR(S) : Katsumi Murofushi and Yoshikazu Hosoda It is certified that error appears in the above-identified patent and that said Letters Patent is hereby corrected as shown below:

Title page,
Item [75], Inventors, name should read -- Katsumi Murofushi and Yoshikazu Hosoda

Signed and Sealed this

First Day of February, 2005

JON W. DUDAS
*Director of the United States Patent and Trademark Office*